(12) United States Patent
Koka

(10) Patent No.: US 12,447,341 B2
(45) Date of Patent: Oct. 21, 2025

(54) EVOKED RESPONSE-BASED SYSTEMS AND METHODS FOR DETERMINING ELECTRODE POSITIONING WITHIN A COCHLEA

(71) Applicant: Advanced Bionics AG, Staefa (CH)

(72) Inventor: Kanthaiah Koka, Valencia, CA (US)

(73) Assignee: Advanced Bionics AG, Staefa (CH)

( * ) Notice: Subject to any disclaimer, the term of this patent is extended or adjusted under 35 U.S.C. 154(b) by 893 days.

(21) Appl. No.: 17/417,345

(22) PCT Filed: Dec. 28, 2018

(86) PCT No.: PCT/US2018/068055
§ 371 (c)(1),
(2) Date: Jun. 22, 2021

(87) PCT Pub. No.: WO2020/139398
PCT Pub. Date: Jul. 2, 2020

(65) Prior Publication Data
US 2022/0072308 A1    Mar. 10, 2022

(51) Int. Cl.
*A61N 1/36* (2006.01)
*A61N 1/05* (2006.01)
(Continued)

(52) U.S. Cl.
CPC ....... *A61N 1/36039* (2017.08); *A61N 1/0541* (2013.01); *G06F 3/0481* (2013.01);
(Continued)

(58) Field of Classification Search
CPC ............. A61N 1/36039; A61N 1/0541; A61N 1/37247; G06F 3/0481; G06F 3/04847; G06F 3/162; H04R 25/70; H04R 2225/67
(Continued)

(56) References Cited

U.S. PATENT DOCUMENTS 4,577,641 A * 3/1986 Hochmair ............... A61F 11/04
381/60
5,626,629 A  5/1997 Faltys et al.
(Continued)

FOREIGN PATENT DOCUMENTS

EP    3406296    11/2018
WO    2018171885  9/2018

OTHER PUBLICATIONS

DeVries, L., Arenberg, J.G. Psychophysical Tuning Curves as a Correlate of Electrode Position in Cochlear Implant Listeners. JARO 19, 571-587 (2018). https://doi.org/10.1007/s10162-018-0678-4 (Year: 2018).*

(Continued)

*Primary Examiner* — Niketa Patel
*Assistant Examiner* — Philip C Edwards
(74) *Attorney, Agent, or Firm* — ALG Intellectual Property, LLC

(57) ABSTRACT

An exemplary system directs a display screen to display a graphical user interface that includes a selectable option to perform an electrode sweep with respect to a plurality of electrodes disposed on an electrode lead implanted at least partially within a cochlea of a recipient of a cochlear implant, detects a selection by a user of the option, directs, in response to the selection of the option, an acoustic stimulation generator to apply acoustic stimulation having a frequency to the recipient, directs the cochlear implant to use each electrode included in the plurality of electrodes to record an evoked response measurement in response to the acoustic stimulation, determines an amplitude of each of the evoked response measurements recorded by the plurality of electrodes, and presents, within the graphical user interface, a tuning curve that graphically indicates the amplitudes of the evoked response measurements.

20 Claims, 21 Drawing Sheets

(51) Int. Cl.
*G06F 3/0481* (2022.01)
*G06F 3/04847* (2022.01)
*G06F 3/16* (2006.01)
*H04R 25/00* (2006.01)

(52) U.S. Cl.
CPC .......... *G06F 3/04847* (2013.01); *G06F 3/162* (2013.01); *H04R 25/70* (2013.01); *H04R 2225/67* (2013.01)

(58) Field of Classification Search
USPC .......................................................... 607/57
See application file for complete search history.

(56) References Cited

U.S. PATENT DOCUMENTS

| | | | |
|---|---|---|---|
| 6,751,505 B1* | 6/2004 | Van Den Honert | ......................... A61N 1/36039 600/559 |
| 8,834,545 B2* | 9/2014 | Stafford | ............... A61N 5/0622 607/57 |
| 9,486,630 B2 | 11/2016 | Litvak et al. | |
| 10,052,480 B2 | 8/2018 | Smith | |
| 2012/0029377 A1* | 2/2012 | Polak | ................... A61B 5/0031 600/544 |
| 2015/0018897 A1* | 1/2015 | Laudanski | ......... A61N 1/36036 607/57 |
| 2015/0112408 A1* | 4/2015 | Kals | ..................... A61N 1/0541 607/57 |
| 2015/0343217 A1* | 12/2015 | Smith | ................ A61N 1/36038 607/57 |
| 2016/0015974 A1* | 1/2016 | Milczynski | ........ A61N 1/36039 607/57 |
| 2018/0140828 A1 | 5/2018 | Lineaweaver | |
| 2020/0206507 A1* | 7/2020 | Koka | ................. A61N 1/36038 |

OTHER PUBLICATIONS

International Search Report and Written Opinion received in International Application No. PCT/US18/68055.

Campbell, et al., Electrophysiological Evidence of the Basilar-Membrane Travelling Wave and Frequency Place Coding of Sound in Cochlear Implant Recipients, Audiol Neurotol 2017;22:180-189, published Oct. 31, 2017.

Helmstaedter, et al., The Summating Potential is a Reliable Marker of Electrode Position in Electrocochleography: Cochlear Implant as a Theragnostic Probe, Ear & Hearing, vol. XX, No. XX, 00-00, 2017, Wolters Kluwer Health, Inc.

* cited by examiner

EVOKED RESPONSE-BASED SYSTEMS AND METHODS FOR DETERMINING ELECTRODE POSITIONING WITHIN A COCHLEA

BACKGROUND INFORMATION

Subsequent to an insertion procedure in which an electrode lead is placed within the cochlea, it may be desirable to determine individual electrode positioning within the cochlea. This may allow a fitting system to appropriately program a cochlear implant system of which the electrode lead is a part. For example, if a particular electrode is positioned at a location within the cochlea that corresponds to a particular frequency, the fitting system may map the particular frequency to the electrode. In this manner, when sound having the particular frequency is subsequently presented to a recipient of the cochlear implant system, the cochlear implant system may apply electrical stimulation representative of the sound to the electrode and thereby allow the recipient to accurately perceive the frequency of the sound.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
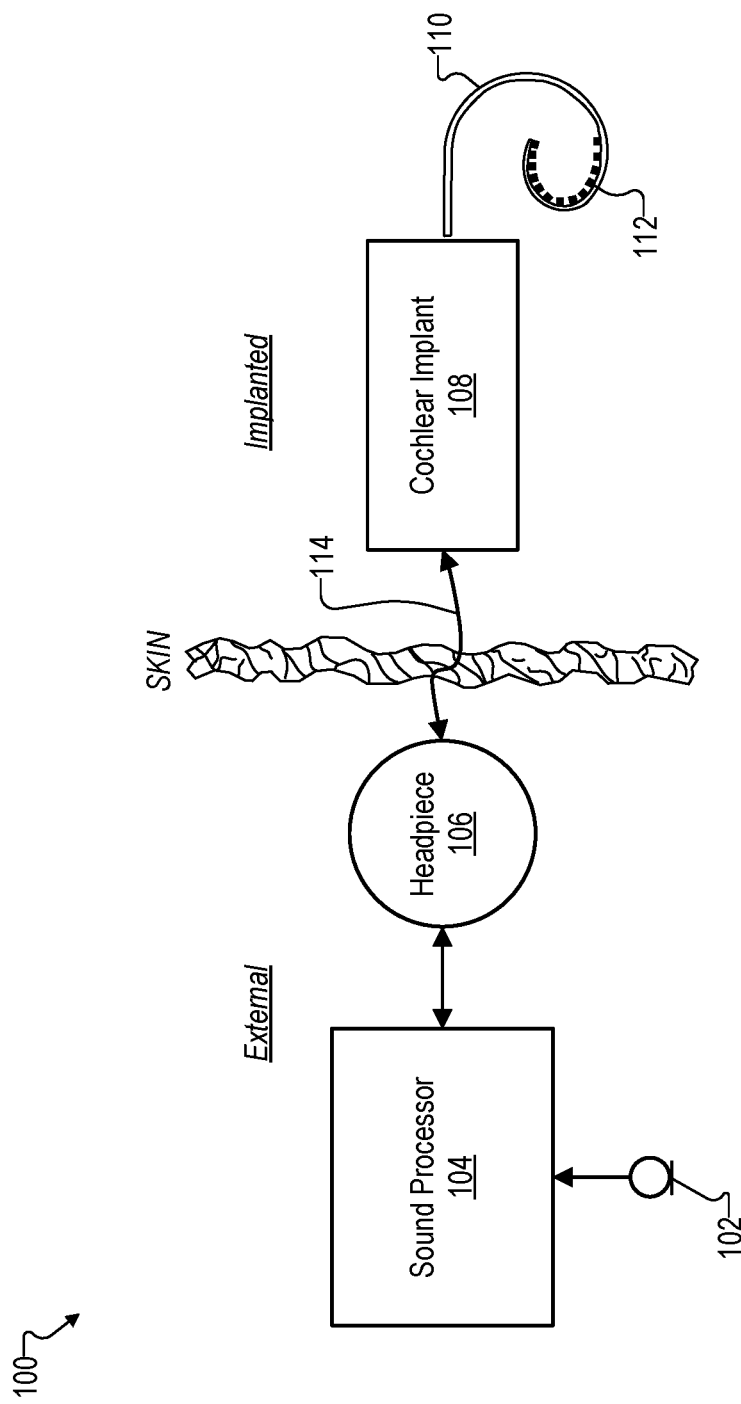
FIG. 1 illustrates an exemplary cochlear implant system according to principles described herein.

Evoked response-based systems and methods for determining electrode positioning within a cochlea are described herein. For example, a diagnostic system may 1) direct a display screen to display a graphical user interface that includes a selectable option to perform an electrode sweep with respect to a plurality of electrodes disposed on an electrode lead implanted at least partially within a cochlea of a recipient of a cochlear implant, 2) detect a selection by a user of the option, 3) direct, in response to the selection of the option, an acoustic stimulation generator to apply acoustic stimulation having a frequency to the recipient, 4) direct the cochlear implant to use each electrode included in the plurality of electrodes to record an evoked response measurement in response to the acoustic stimulation, 5) determine an amplitude of each of the evoked response measurements recorded by the plurality of electrodes, and 6) present, within the graphical user interface, a tuning curve that graphically indicates the amplitudes of the evoked response measurements. The evoked response measurements may be indicative of evoked responses that occur within the recipient in response to acoustic stimulation applied to the recipient. The evoked responses may each be an ECoG potential (e.g., a cochlear microphonic potential, an action potential, a summating potential, etc.), an auditory nerve response, a brainstem response, a compound action potential, a stapedius reflex, and/or any other type of neural or physiological response that may occur within a recipient in response to application of acoustic stimulation to the recipient. Evoked responses may originate from neural tissues, hair cell to neural synapses, inner or outer hair cells, or other sources.

As will be described herein, a peak amplitude value in the tuning curve corresponds to an electrode on the electrode lead that has the highest evoked response amplitude out of all the electrodes on the electrode lead in response to the acoustic stimulation. This may mean that the electrode is closer than all of the other electrodes on the electrode lead to the location within the cochlea that corresponds to the frequency of the acoustic stimulation. Hence, in some examples, the diagnostic system may identify a peak amplitude value in the tuning curve, identify an electrode on the electrode array that corresponds to the peak amplitude value, and map the frequency to the identified electrode. The mapping may include, for example, programming a sound processor to direct a cochlear implant connected to the electrode lead to apply electrical stimulation representative of the frequency by way of the identified electrode.

In some examples, the systems and methods described herein are implemented by a stand-alone diagnostic system that includes a computing module and a base module configured to attach to the computing module (e.g., a back side of the computing module) and serve as a stand for the computing module. The computing module includes a display screen and a processor configured to direct the display screen to display a graphical user interface that includes a selectable option to perform an electrode sweep with respect to a plurality of electrodes disposed on an electrode lead implanted at least partially within a cochlea of a recipient of a cochlear implant. The base module houses an interface unit configured to be communicatively coupled to the processor and to a cochlear implant while the base module is attached to the computing module. In this configuration, the processor may be configured to 1) detect a selection by a user of the option, 2) direct, in response to the selection of the option, the interface unit to apply acoustic stimulation having a frequency to the recipient, 3) direct the interface unit to instruct the cochlear implant to use each electrode included in the plurality of electrodes to record an evoked response measurement in response to the acoustic stimulation, 4) determine an amplitude of each of the evoked response measurements recorded by the plurality of electrodes, and 5) present, within the graphical user interface, a tuning curve that graphically indicates the amplitudes of the evoked response measurements.

The systems and methods described herein may advantageously allow a user to readily ascertain electrode positioning within a cochlea. For example, immediately following an electrode lead insertion procedure in which an electrode lead is inserted into a cochlea of a recipient of a cochlear implant, a surgeon or other user may utilize the systems and methods described herein to determine positioning of each of the electrodes on the electrode lead within the cochlea. This may allow the surgeon to verify correct placement of the electrode lead within the cochlea, determine that one or more adjustments to the placement of the electrode lead within the cochlea are to be made, and/or determine appropriate programming for a sound processor that is to be used with the cochlear implant. In other examples, a clinician may utilize the systems and methods described herein to appropriately adjust programming parameters for a sound processor used by the recipient during one or more follow-up visits subsequent to the initial electrode lead insertion procedure.

FIG. 1 illustrates an exemplary cochlear implant system 100. As shown, cochlear implant system 100 may include a microphone 102, a sound processor 104, a headpiece 106 having a coil disposed therein, a cochlear implant 108, and an electrode lead 110. Electrode lead 110 may include an array of electrodes 112 disposed on a distal portion of electrode lead 110 and that are configured to be inserted into a cochlea of a recipient to stimulate the cochlea when the distal portion of electrode lead 110 is inserted into the cochlea. One or more other electrodes (e.g., including a ground electrode, not explicitly shown) may also be disposed on other parts of electrode lead 110 (e.g., on a proximal portion of electrode lead 110) to, for example, provide a current return path for stimulation current generated by electrodes 112 and to remain external to the cochlea after electrode lead 110 is inserted into the cochlea. As shown, electrode lead 110 may be pre-curved so as to properly fit within the spiral shape of the cochlea. Additional or alternative components may be included within cochlear implant system 100 as may serve a particular implementation.

As shown, cochlear implant system 100 may include various components configured to be located external to a recipient including, but not limited to, microphone 102, sound processor 104, and headpiece 106. Cochlear implant system 100 may further include various components configured to be implanted within the recipient including, but not limited to, cochlear implant 108 and electrode lead 110.

Microphone 102 may be configured to detect audio signals presented to the user. Microphone 102 may be implemented in any suitable manner. For example, microphone 102 may include a microphone that is configured to be placed within the concha of the ear near the entrance to the ear canal, such as a T-MIC™ microphone from Advanced Bionics. Such a microphone may be held within the concha of the ear near the entrance of the ear canal during normal operation by a boom or stalk that is attached to an ear hook configured to be selectively attached to sound processor 104. Additionally or alternatively, microphone 102 may be implemented by one or more microphones disposed within headpiece 106, one or more microphones disposed within sound processor 104, one or more beam-forming microphones, and/or any other suitable microphone as may serve a particular implementation.

Sound processor 104 may be configured to direct cochlear implant 108 to generate and apply electrical stimulation (also referred to herein as "stimulation current") representative of one or more audio signals (e.g., one or more audio signals detected by microphone 102, input by way of an auxiliary audio input port, input by way of a clinician's programming interface (CPI) device, etc.) to one or more stimulation sites associated with an auditory pathway (e.g., the auditory nerve) of the recipient. Exemplary stimulation sites include, but are not limited to, one or more locations within the cochlea, the cochlear nucleus, the inferior colliculus, and/or any other nuclei in the auditory pathway. To this end, sound processor 104 may process the one or more audio signals in accordance with a selected sound processing strategy or program to generate appropriate stimulation parameters for controlling cochlear implant 108. Sound processor 104 may be housed within any suitable housing (e.g., a behind-the-ear ("BTE") unit, a body worn device, headpiece 106, and/or any other sound processing unit as may serve a particular implementation).

In some examples, sound processor 104 may wirelessly transmit stimulation parameters (e.g., in the form of data words included in a forward telemetry sequence) and/or power signals to cochlear implant 108 by way of a wireless communication link 114 between headpiece 106 and cochlear implant 108 (e.g., a wireless link between a coil disposed within headpiece 106 and a coil physically coupled to cochlear implant 108). It will be understood that communication link 114 may include a bi-directional communication link and/or one or more dedicated uni-directional communication links.

Headpiece 106 may be communicatively coupled to sound processor 104 and may include an external antenna (e.g., a coil and/or one or more wireless communication components) configured to facilitate selective wireless coupling of sound processor 104 to cochlear implant 108. Headpiece 106 may additionally or alternatively be used to selectively and wirelessly couple any other external device to cochlear implant 108. To this end, headpiece 106 may be configured to be affixed to the recipient's head and positioned such that the external antenna housed within headpiece 106 is communicatively coupled to a corresponding implantable antenna (which may also be implemented by a coil and/or one or more wireless communication components) included within or otherwise associated with cochlear implant 108. In this manner, stimulation parameters and/or power signals may be wirelessly transmitted between sound processor 104 and cochlear implant 108 via communication link 114.

Cochlear implant 108 may include any suitable type of implantable stimulator. For example, cochlear implant 108 may be implemented by an implantable cochlear stimulator. Additionally or alternatively, cochlear implant 108 may include a brainstem implant and/or any other type of cochlear implant that may be implanted within a recipient and configured to apply stimulation to one or more stimulation sites located along an auditory pathway of a recipient.

In some examples, cochlear implant 108 may be configured to generate electrical stimulation representative of an audio signal processed by sound processor 104 (e.g., an audio signal detected by microphone 102) in accordance with one or more stimulation parameters transmitted thereto by sound processor 104. Cochlear implant 108 may be further configured to apply the electrical stimulation to one or more stimulation sites (e.g., one or more intracochlear regions) within the recipient via electrodes 112 disposed along electrode lead 110. In some examples, cochlear implant 108 may include a plurality of independent current sources each associated with a channel defined by one or more of electrodes 112. In this manner, different stimulation current levels may be applied to multiple stimulation sites simultaneously by way of multiple electrodes 112.

Figure 2:
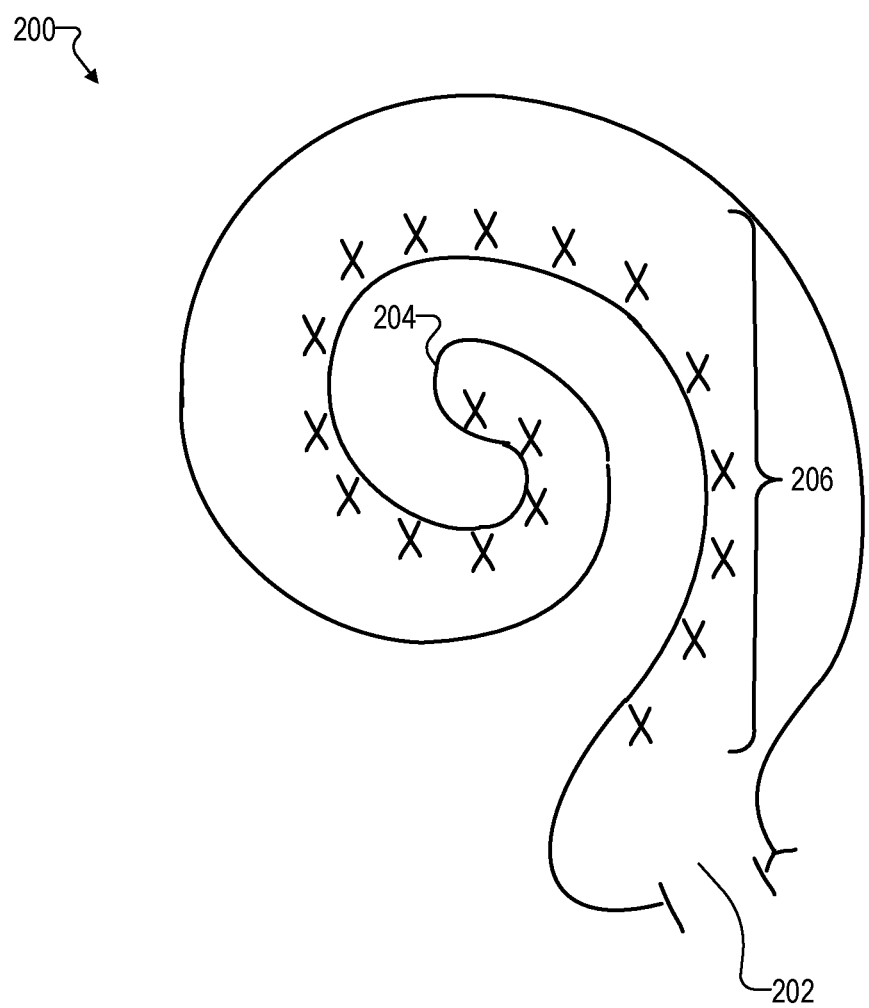
FIG. 2 illustrates a schematic structure of the human cochlea according to principles described herein.

FIG. 2 illustrates a schematic structure of the human cochlea 200 into which electrode lead 110 may be inserted. As shown in FIG. 2, cochlea 200 is in the shape of a spiral beginning at a base 202 and ending at an apex 204. Within cochlea 200 resides auditory nerve tissue 206, which is denoted by Xs in FIG. 2. The auditory nerve tissue 206 is organized within the cochlea 200 in a tonotopic manner. Relatively low frequencies are encoded at or near the apex 204 of the cochlea 200 (referred to as an "apical region") while relatively high frequencies are encoded at or near the base 202 (referred to as a "basal region"). Hence, electrical stimulation applied by way of electrodes disposed within the apical region (i.e., "apical electrodes") may result in the recipient perceiving relatively low frequencies and electrical stimulation applied by way of electrodes disposed within the basal region (i.e., "basal electrodes") may result in the recipient perceiving relatively high frequencies. The delineation between the apical and basal electrodes on a particular electrode lead may vary depending on the insertion depth of the electrode lead, the anatomy of the recipient's cochlea, and/or any other factor as may serve a particular implementation.

Figure 3:
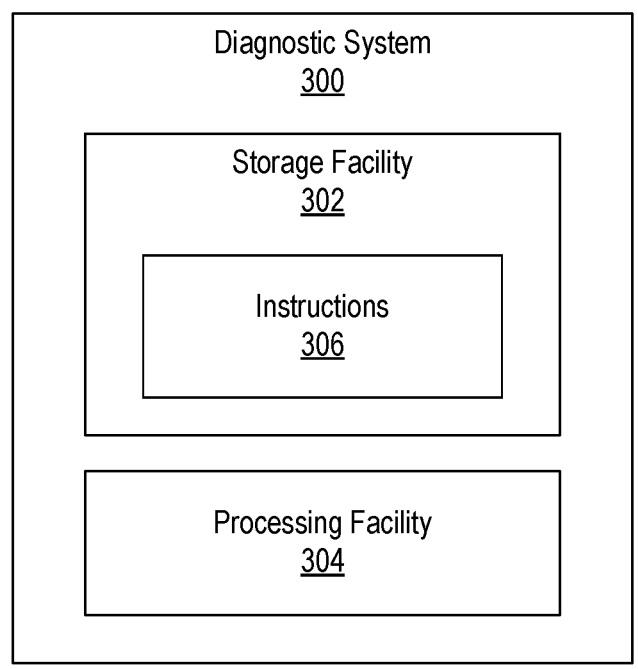
FIG. 3 illustrates an exemplary diagnostic system according to principles described herein.

FIG. 3 illustrates an exemplary diagnostic system 300 that may be configured to perform any of the operations described herein. As shown, diagnostic system 300 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform any of the operations described herein. For example, storage facility 302 may store instructions 306 that may be executed by processing facility 304 to perform any of the operations described herein. Instructions 306 may be implemented by any suitable application, software, code, and/or other executable data instance. Storage facility 302 may also maintain any data received, generated, managed, used, and/or transmitted by processing facility 304.

Processing facility 304 may be configured to perform (e.g., execute instructions 306 stored in storage facility 302 to perform) various operations associated with determining electrode positioning within a cochlea. For example, processing facility 304 may direct a display screen to display a graphical user interface that includes a selectable option to perform an electrode sweep with respect to a plurality of electrodes disposed on an electrode lead implanted at least partially within a cochlea of a recipient of a cochlear implant, detect a selection by a user of the option, direct, in response to the selection of the option, an acoustic stimulation generator to apply acoustic stimulation having a frequency to the recipient, direct the cochlear implant to use each electrode included in the plurality of electrodes to record an evoked response measurement in response to the acoustic stimulation, determine an amplitude of each of the evoked response measurements recorded by the plurality of electrodes, and present, within the graphical user interface, a tuning curve that graphically indicates the amplitudes of the evoked response measurements. These and other operations that may be performed by processing facility 304 are described in more detail herein.

Diagnostic system 300 may be implemented in any suitable manner. For example, diagnostic system 300 may be implemented by a stand-alone diagnostic system that may be used in a surgical operating room to perform any of the operations described herein.

Figure 4:
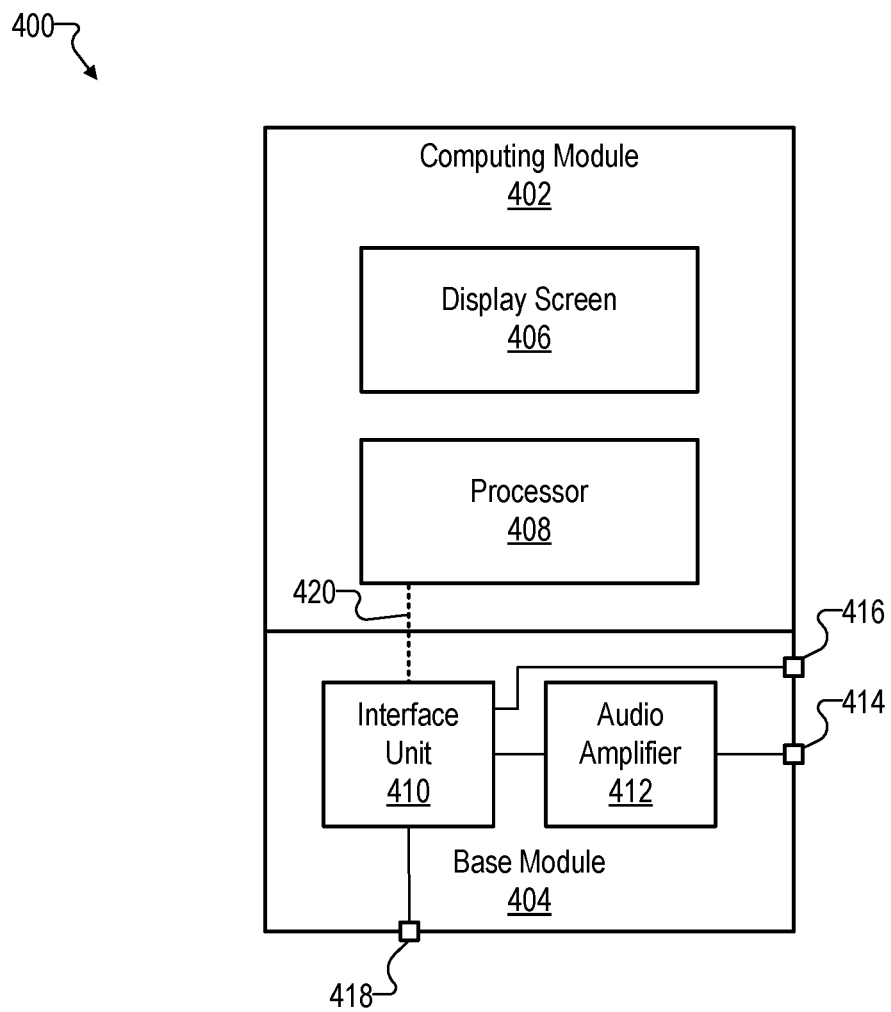
FIG. 4 illustrates an exemplary stand-alone diagnostic system according to principles described herein.

FIG. 4 illustrates an exemplary stand-alone diagnostic system 400 that may implement diagnostic system 300. As shown, diagnostic system 400 includes a computing module 402 and a base module 404. Computing module 402 includes a display screen 406 and a processor 408. Base module 404 includes an interface unit 410, an audio amplifier 412, an audio output port 414, a communications port 416, and a port 418. Computing module 402 and base module 404 may include additional or alternative components as may serve a particular implementation. For example, computing module 402 and/or base module 404 may include one or more speakers configured to output acoustic feedback and/or other types of sound configured to be heard by a surgeon and/or other user of diagnostic system 400. Diagnostic system 400 and exemplary implementations thereof are described more fully in co-pending PCT Application No. PCT/US18/67900, which application is filed the same day as the present application and incorporated herein by reference in its entirety.

In the configuration shown in FIG. 4, base module 404 is physically attached to computing module 402. In this configuration, processor 408 is communicatively coupled to interface unit 410 by way of a connection 420. Connection 420 may be implemented by any suitable connection (e.g., an internal USB connection) as may serve a particular implementation. As will be described in more detail below, base module 404 may be selectively detached from computing module 402 and connected to a different computing device by way of port 418.

Display screen 406 may be configured to display any suitable content associated with an application executed by processor 408. Display screen 406 may be implemented by a touchscreen and/or any other type of display screen as may serve a particular implementation.

Processor 408 may be configured to execute a diagnostic application associated with a cochlear implant (e.g., cochlear implant 108). For example, processor 408 may execute a diagnostic application that may be used during a procedure (e.g., an intraoperative or postoperative procedure) associated with the cochlear implant. The diagnostic application may be configured to perform various diagnostic operations associated with the cochlear implant during the procedure. Exemplary diagnostic operations are described herein.

In some examples, processor 408 may direct display screen 406 to display a graphical user interface associated with the diagnostic application being executed by processor 408. A user may interact with the graphical user interface to adjust one or more parameters associated with the cochlear implant and/or otherwise obtain information that may be useful during a procedure associated with the cochlear implant.

Base module 404 may be configured to attach to computing module 402 and serve as a stand for computing module 402.

Interface unit 410 is configured to be communicatively coupled to processor 408 by way of connection 420 while base module 404 is attached to computing module 402. Interface unit 410 is further configured to be communicatively coupled to the cochlear implant while base module 404 is attached to computing module 402. In this manner, interface unit 410 provides an interface between processor 408 and the cochlear implant.

Interface unit 410 may be communicatively coupled to the cochlear implant by way of communications port 416. For example, communications port 416 may be selectively coupled to a coil (e.g., a coil included in a headpiece, such as headpiece 106, or a disposable stand-alone coil) configured to wirelessly communicate with the cochlear implant. Interface unit 410 may communicate with the cochlear implant by transmitting and/or receiving data to/from the cochlear implant by way of the coil connected to communications port 416.

Interface unit 410 may be further configured to generate and provide acoustic stimulation (e.g., sound waves) to the recipient of the cochlear implant. To this end, audio output port 414 is configured to be selectively coupled to a sound delivery apparatus. In some examples, the sound delivery apparatus may be implemented by tubing that has a distal portion configured to be placed in or near an entrance to an ear canal of a recipient of the cochlear implant. While the sound delivery apparatus is connected to audio output port 414, interface unit 410 may transmit the acoustic stimulation to the recipient by way of the sound delivery apparatus.

As shown, audio amplifier 412 may be positioned within a path between interface unit 410 and audio output port 414. In this configuration, audio amplifier 412 may be configured to amplify the acoustic stimulation before the acoustic stimulation is delivered to the recipient by way of audio output port 414 and the sound delivery apparatus. In some alternative examples, amplification of the acoustic stimulation generated by interface unit 410 is not necessary, thereby obviating the need for audio amplifier 412 to be included in base module 404. Hence, in some implementations, base module 404 does not include audio amplifier 412.

In some examples, diagnostic system 400 may be configured to self-calibrate and/or perform in-situ testing. For example, processor 408 may calibrate an amplitude level of acoustic stimulation generated by interface unit 410 before and/or during a procedure in which diagnostic system 400 is used to perform any of the operations described herein. Such self-calibration and in-situ testing may be performed in any suitable manner.

Figure 5:
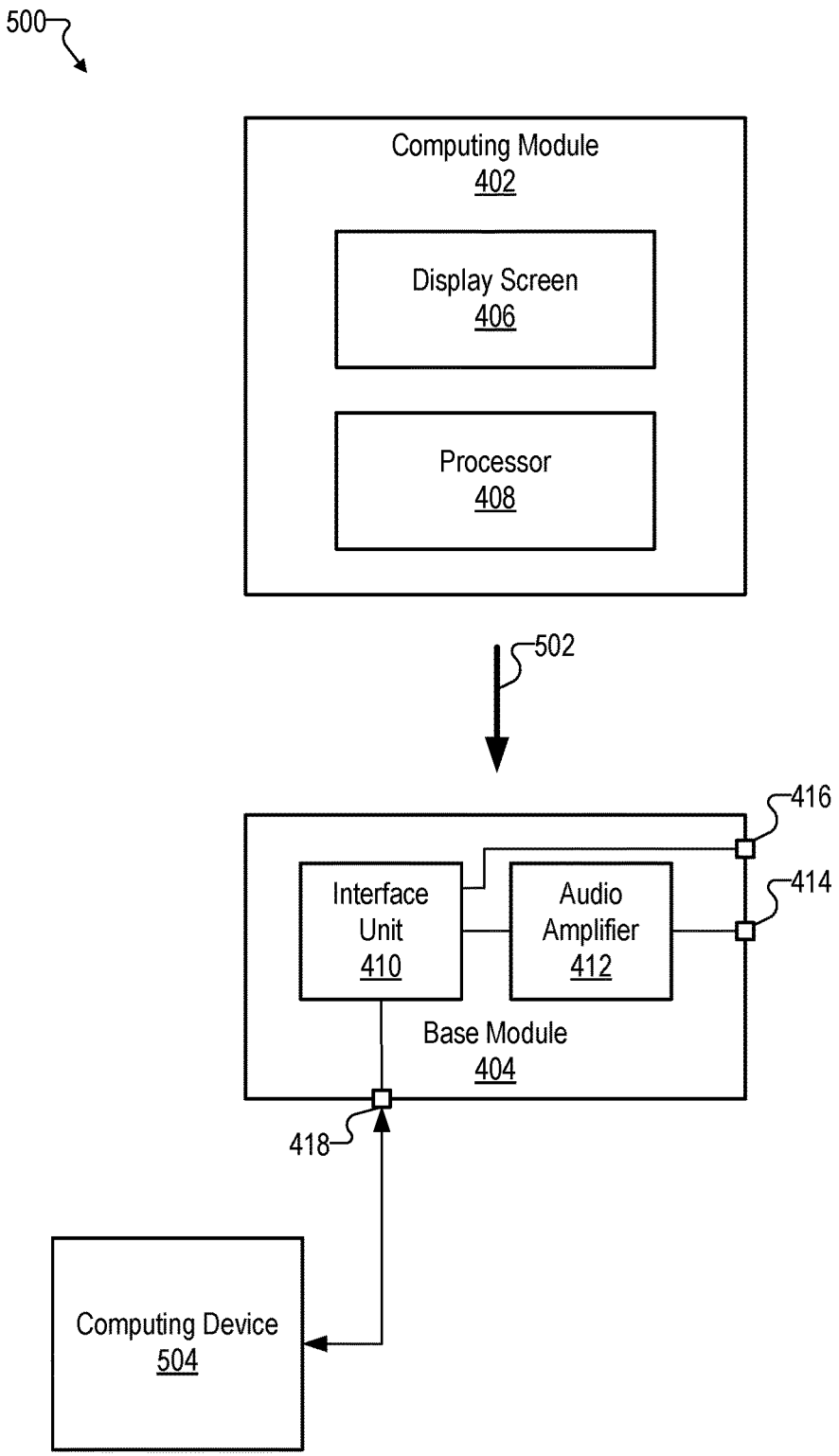
FIG. 5 shows a base module detached from a computing module according to principles described herein.

As mentioned, base module 404 may be selectively detached from computing module 402. To illustrate, FIG. 5 shows a configuration 500 in which base module 404 is detached from computing module 402. This detachment is illustrated by arrow 502. While detached, interface unit 410 of base module 404 may be communicatively coupled to a computing device 504. For example, interface unit 410 may be communicatively coupled to computing device 504 by plugging a cable (e.g., a USB cable) into port 418 and into computing device 504. In this configuration, computing device 504 may use interface unit 410 to interface with a cochlear implant (e.g., by providing acoustic stimulation to a recipient of the cochlear implant and/or receiving recording data from the cochlear implant).

Figure 6:
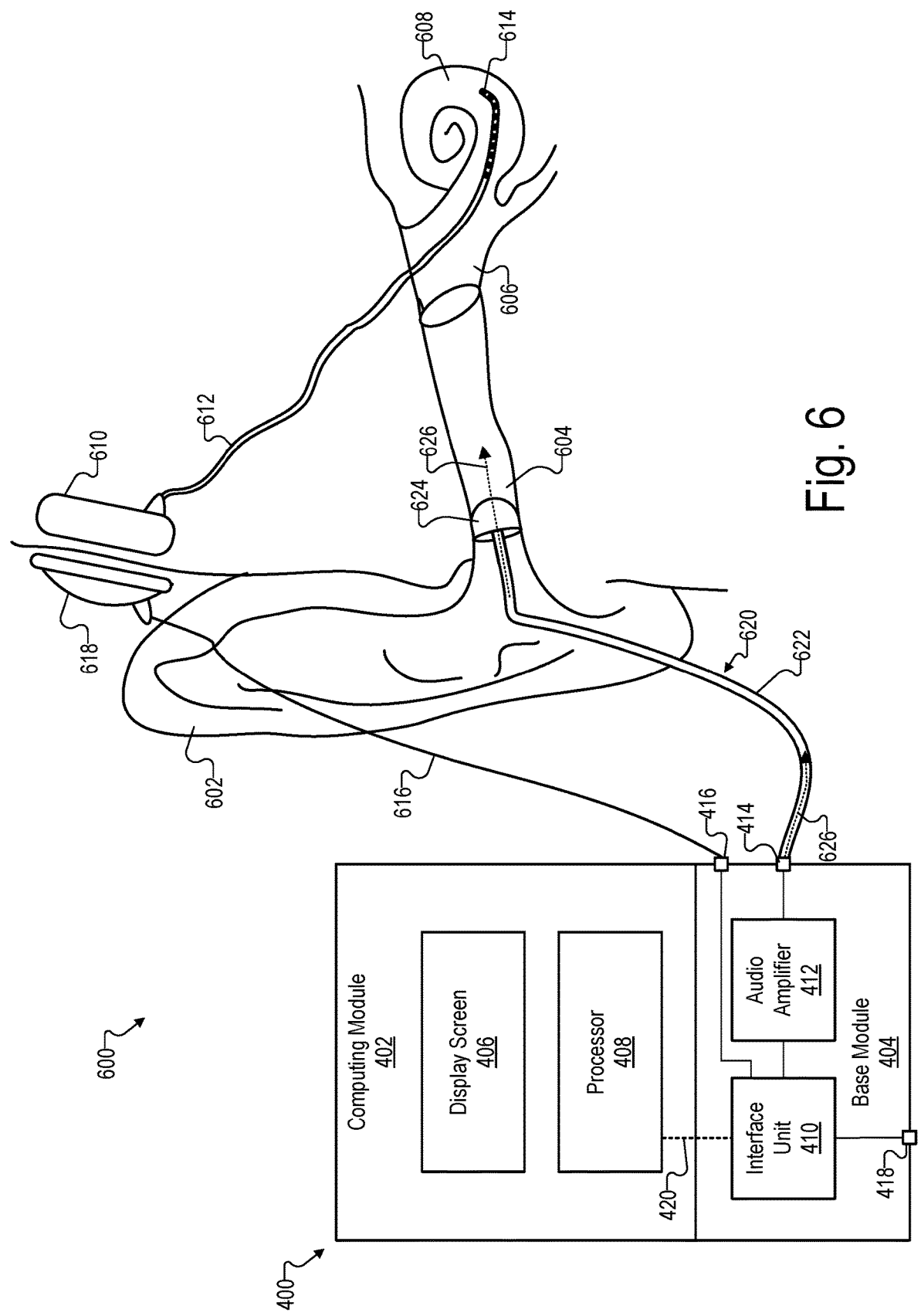
FIGS. 6-8 depict exemplary configurations in which a diagnostic system is used to perform one or more diagnostic operations during a surgical procedure involving an electrode lead according to principles described herein.

FIG. 6 depicts an exemplary configuration 600 in which diagnostic system 400 is used to perform one or more diagnostic operations with respect to a recipient of a cochlear implant. Various anatomical features of the recipient's ear are shown in FIG. 6. Specifically, anatomical features include a pinna 602 (i.e., the outer ear), an ear canal 604, a middle ear 606, and a cochlea 608. While no specific incision or other explicit surgical representation is shown in FIG. 6, it will be understood that such elements may be present when a procedure is ongoing. For example, an incision may be present to allow the surgeon internal access to the recipient to insert the lead into cochlea 608. In some procedures, pinna 602 may be taped down and covered with surgical drapes so as to cover ear canal 604 (e.g., to help prevent fluids from reaching ear canal 604).

In the example of FIG. 6, a cochlear implant 610 and an electrode lead 612 are shown to be implanted within the recipient. Cochlear implant 610 may be similar, for example, to cochlear implant 108, and electrode lead 612 may be similar, for example, to electrode lead 110. Electrode lead 612 includes a plurality of electrodes (e.g., electrode 614, which is the distal-most electrode disposed on electrode lead 612).

As shown, a cable 616 of a headpiece 618 is connected to communications port 416. In this configuration, interface unit 410 may wirelessly communicate with cochlear implant 610 by way a coil and/or other electronics included in headpiece 618, which may be similar to headpiece 106.

As also shown, a sound delivery apparatus 620 is connected to audio output port 414. Sound delivery apparatus 620 includes tubing 622 and an ear insert 624. Ear insert 624 is configured to fit at or within an entrance of ear canal 604. Tubing 622 and ear insert 624 together form a sound propagation channel 626 that delivers acoustic stimulation provided by interface unit 410 to the ear canal 604. Tubing 622 and ear insert 624 may be made out of any suitable material as may serve a particular implementation.

In some examples, processor 408 may execute a diagnostic application. In accordance with the diagnostic application, processor 408 may transmit, by way of connection 420, a command (also referred to as a stimulation command) to interface unit 410 for interface unit 410 to apply acoustic stimulation to the recipient and receive recording data representative of an evoked response that occurs within the recipient in response to the acoustic stimulation. In response to receiving the command, interface unit 410 may generate and apply the acoustic stimulation to the recipient by way of audio output port 414 and sound delivery apparatus 620. Interface unit 410 may also transmit a command (also referred to as a recording command) to cochlear implant 610 by way of communications port 416 and headpiece 618 for cochlear implant 610 to use electrode 614 to record the evoked response that occurs in response to the acoustic stimulation. Cochlear implant 610 may transmit the recording data back to interface unit 410 by way of headpiece 618 and communications port 416. Interface unit 410 may transmit the recording data to processor 408 by way of connection 420. Processor 408 may process the recording data and direct display screen 406 to display one or more graphical user interfaces associated with the recording data.

Figure 7:
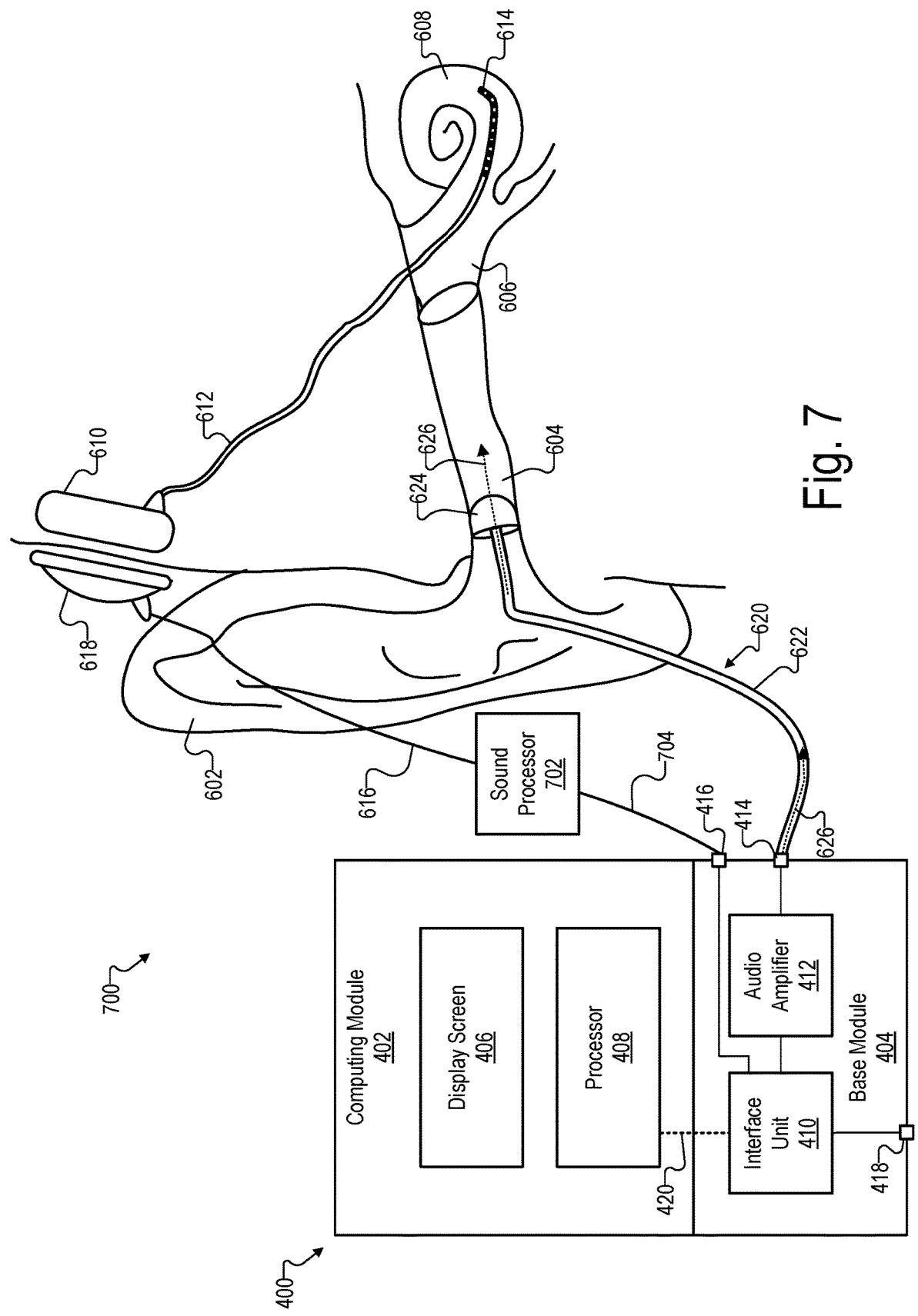

In configuration 600, headpiece 618 is connected directly to communications port 416 by way of cable 616. Hence, in configuration 600, interface unit 410 is configured to directly control cochlear implant 610. FIG. 7 illustrates an alternative configuration 700 in which a sound processor 702 is included in the communication path in between interface unit 410 and cochlear implant 610. Sound processor 702 may be similar to any of the sound processors (e.g., sound processor 104) described herein. In some examples, sound processor 702 is recipient-agnostic. In other words, sound processor 702 is not configured specifically for the recipient of cochlear implant 610. Rather, sound processor 702 may be used in a variety of different procedures associated with a number of different recipients.

As shown, sound processor 702 is connected to communications port 416 by way of a cable 704. Sound processor 702 is also connected to headpiece 618 by way of cable 616.

In this configuration, sound processor 702 may relay data and/or commands between interface unit 410 and cochlear implant 610.

Figure 8:
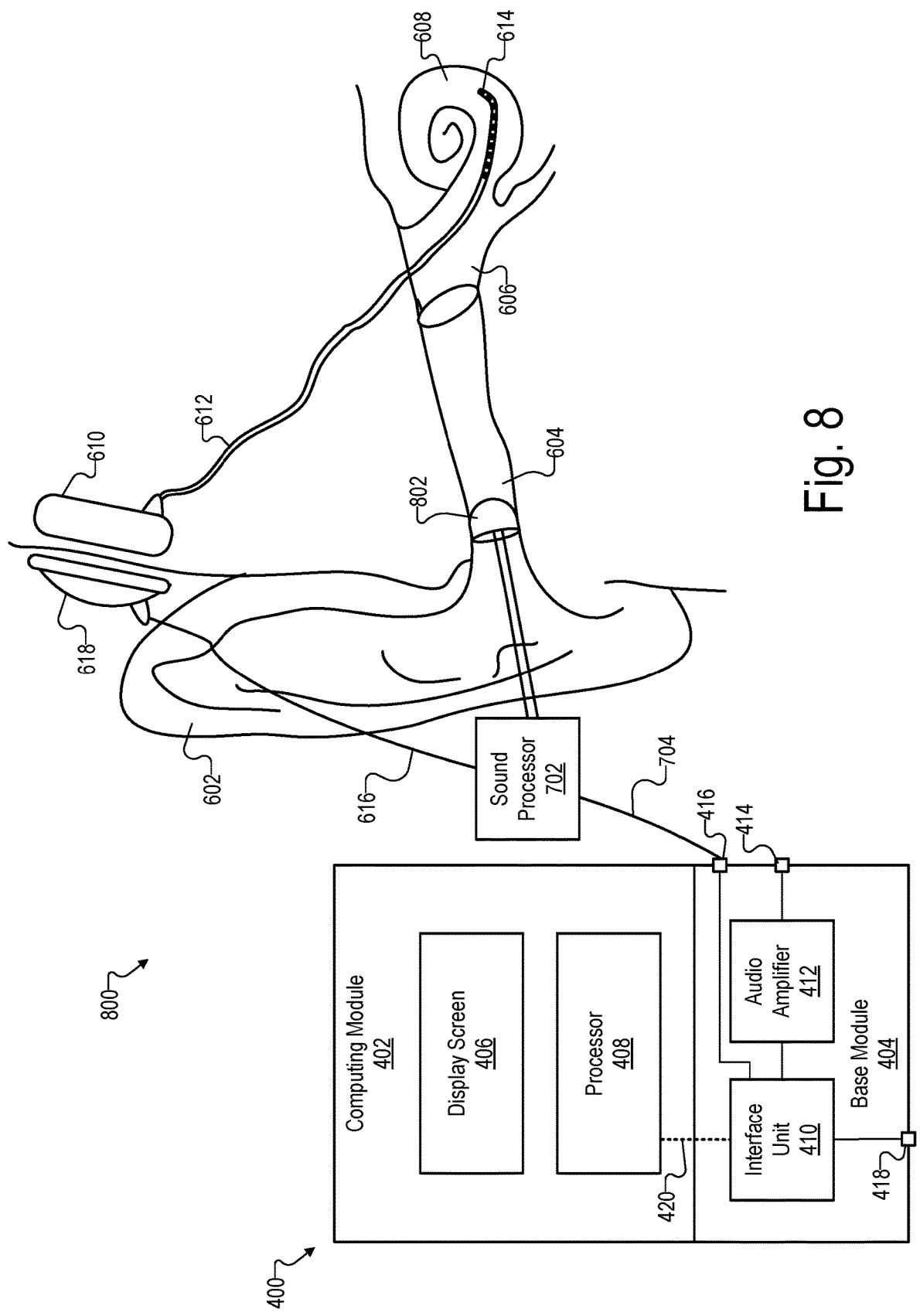

FIG. 8 illustrates an alternative configuration 800 in which sound processor 702 is configured to generate the acoustic stimulation that is applied to the recipient of cochlear implant 610. As shown, in this configuration, a sound delivery apparatus 802 is coupled directly to sound processor 702. For example, sound processor 702 may be implemented by a behind-the-ear bimodal sound processor and sound delivery apparatus 802 may be implemented by an audio ear hook that connects to sound processor 702.

It will be recognized that diagnostic system 400 may be additionally or alternatively implemented in any other suitable manner. For example, diagnostic system 400 may be implemented by a fitting system utilized in a clinician's office and/or by any other appropriately configured system or device.

Figure 9A:
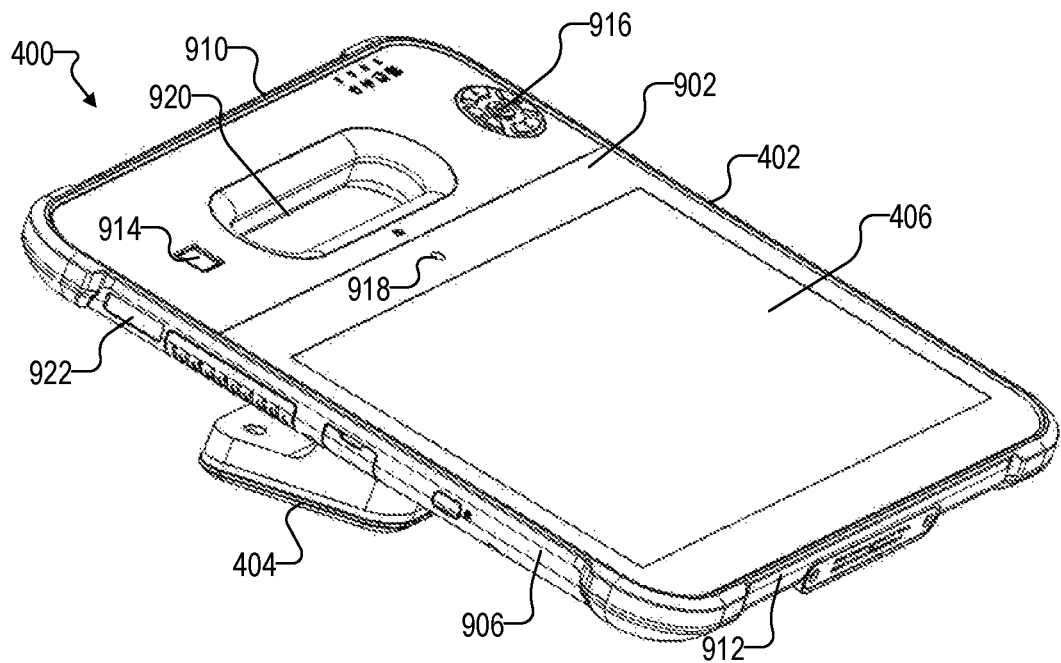
FIGS. 9A-12 illustrate an exemplary hardware implementation of the diagnostic system of FIG. 4 according to principles described herein.
Figure 9B:
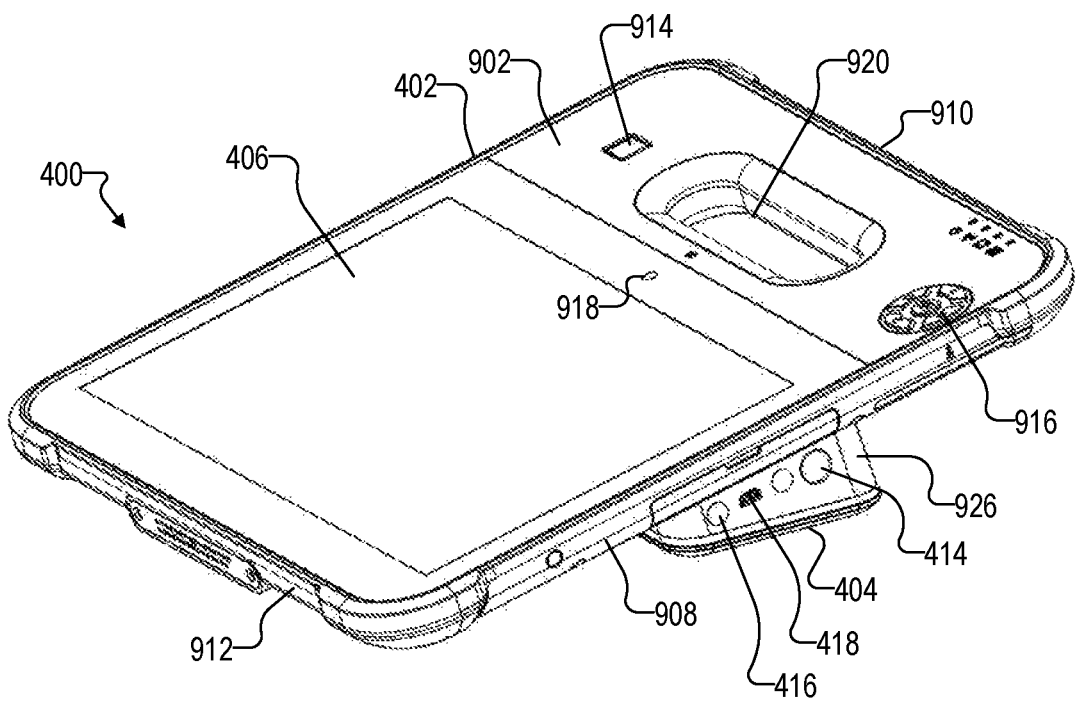
Figure 10A:
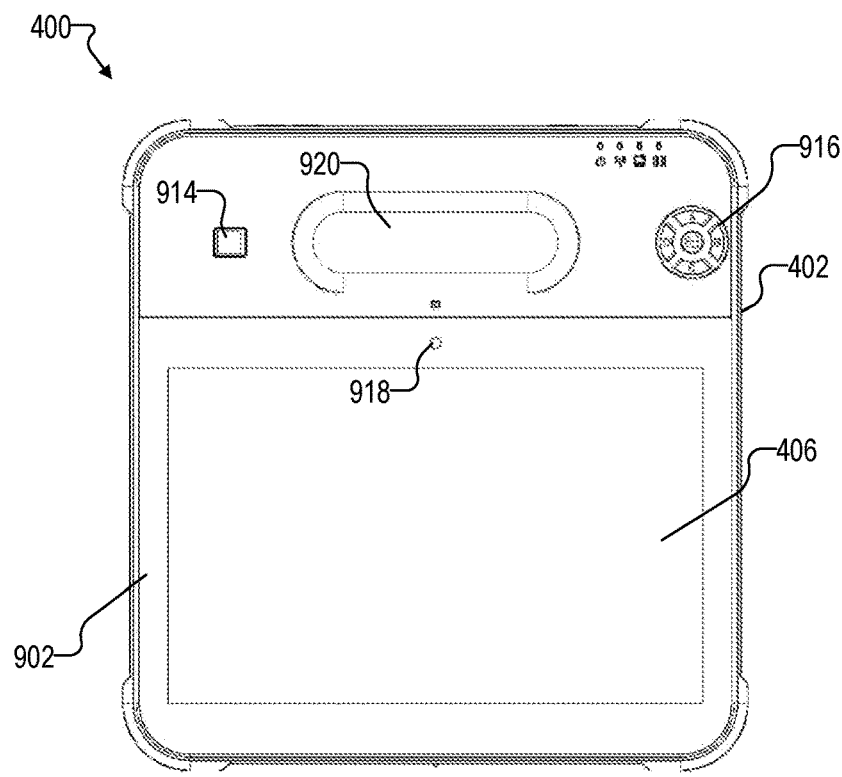
Figure 10B:
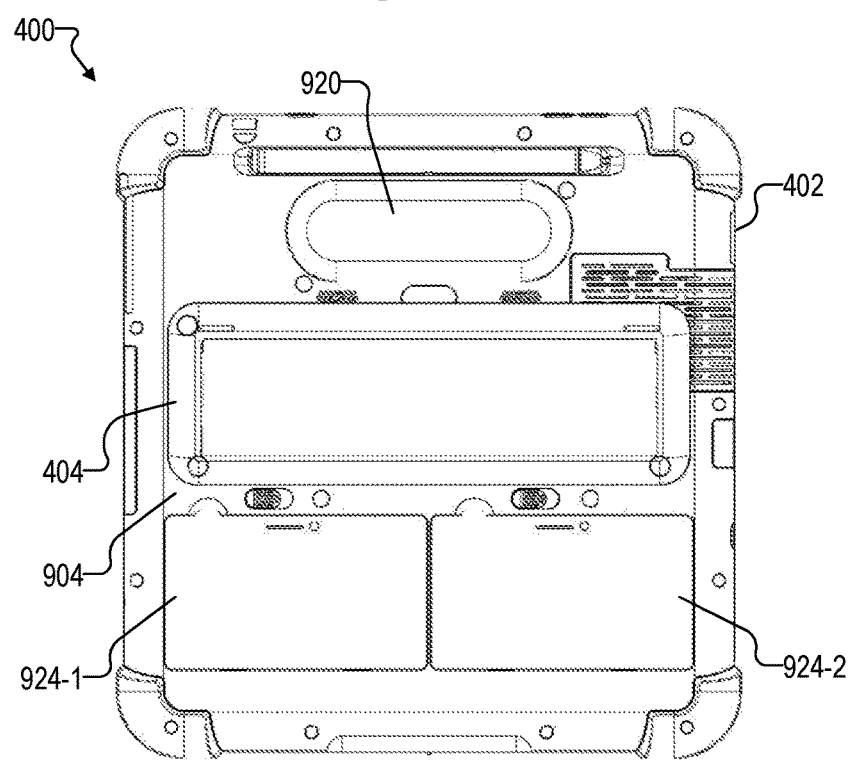
Figure 11A:
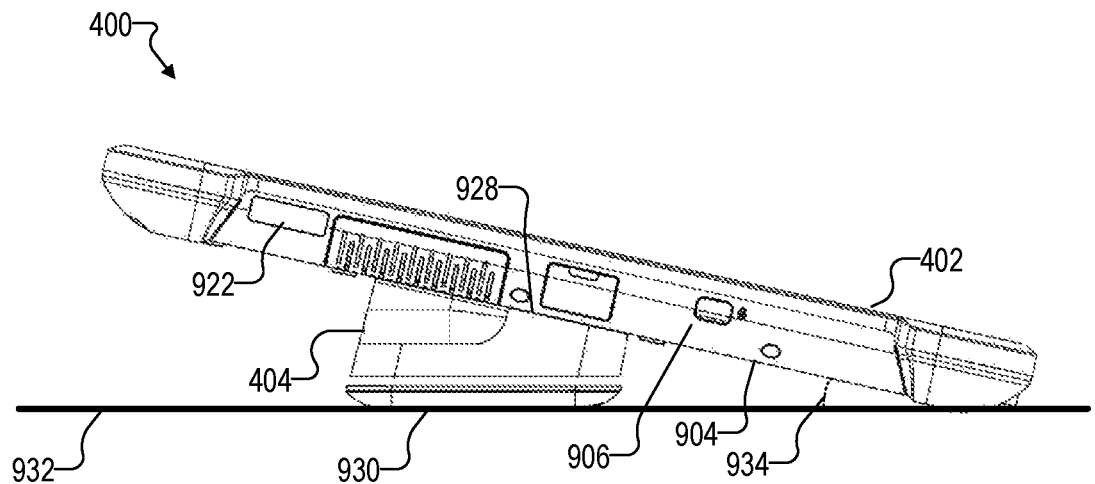
Figure 11B:
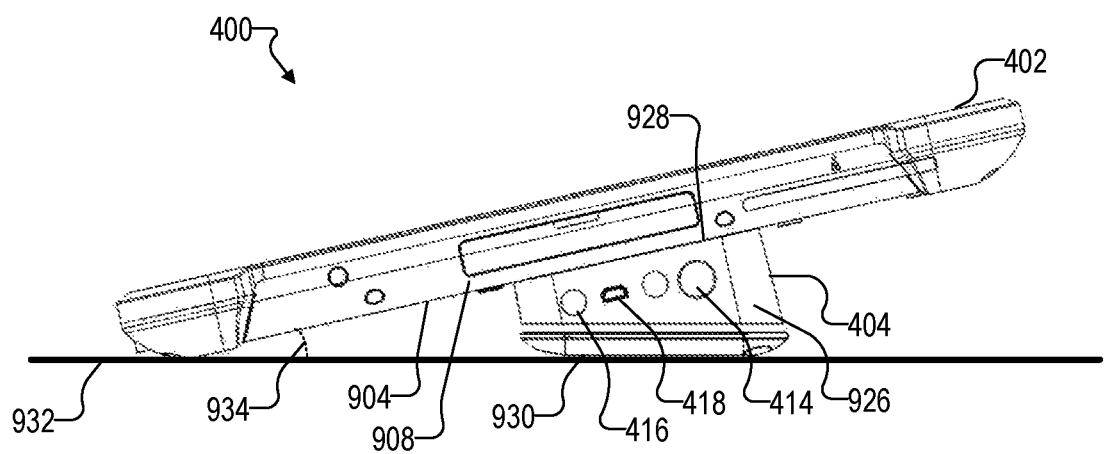
Figure 12:
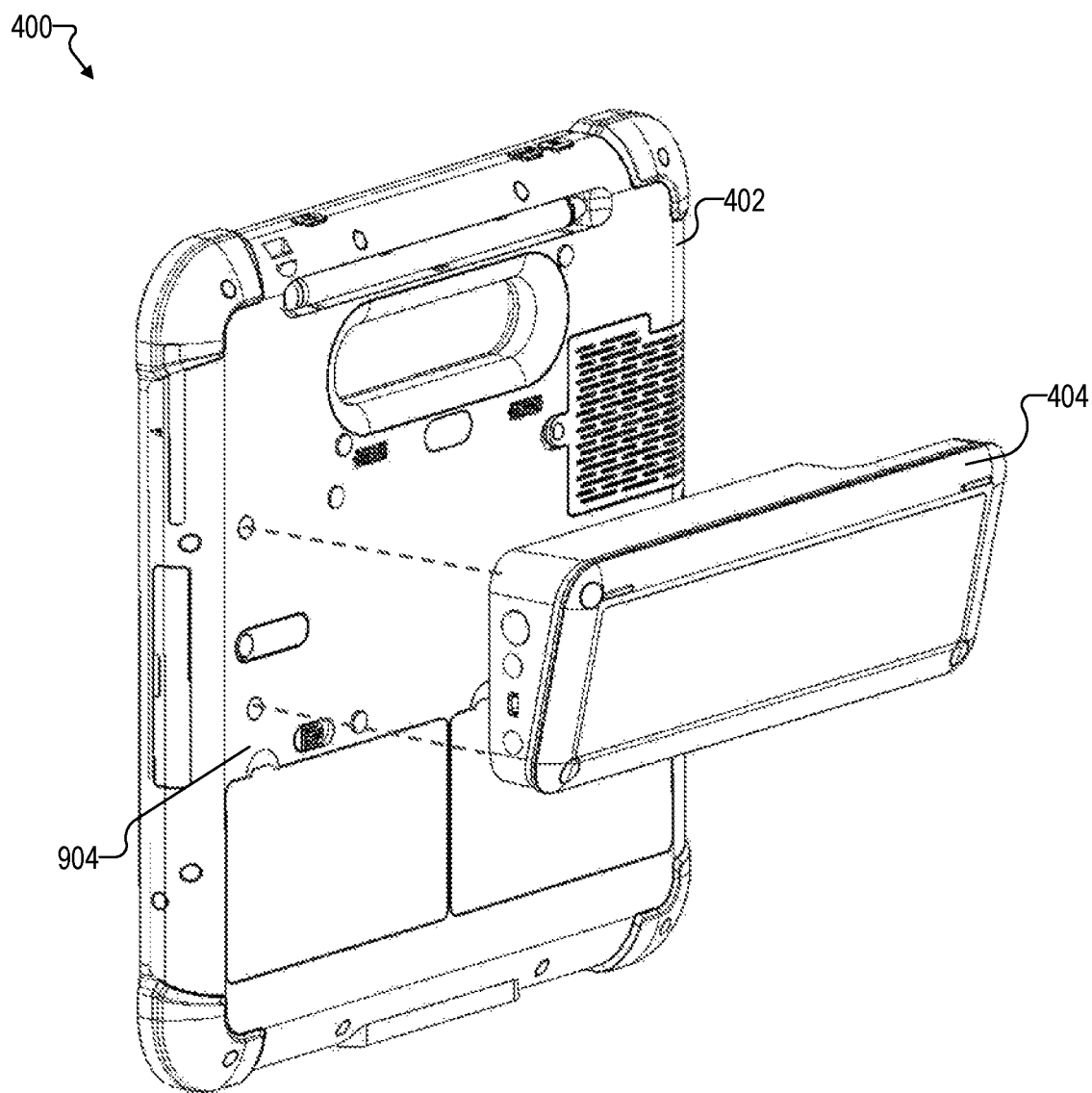

An exemplary hardware implementation of diagnostic system 400 will now be described in connection with FIGS. 9A-12. In particular, FIG. 9A shows a left perspective view of diagnostic system 400, FIG. 9B shows a right perspective view of diagnostic system 400, FIG. 10A shows a front view of diagnostic system 400, FIG. 10B shows a back view of diagnostic system 400, FIG. 11A shows a left side view of diagnostic system 400, FIG. 11B shows a right side view of diagnostic system 400, and FIG. 12 shows a rear perspective view of diagnostic system 400.

The hardware implementation of diagnostic system 400 illustrated in FIGS. 9A-12 includes computing module 402 and base module 404. As, illustrated computing module 402 includes a front side 902, a back side 904, a left side 906, a right side 908, a top side 910, and a bottom side 912.

Display screen 406 is located on front side 902 of computing module 402. Various other components are also located on the front side 902 of computing module 402. For example, a fingerprint scanner 914, physical input buttons 916, and a webcam 918 all shown to be included on the front side 902 of computing module 402. It will be recognized that any of these components may be located on any other side of computing module 402 as may serve a particular implementation.

Fingerprint scanner 914 is configured to facilitate authentication of a user of diagnostic system 400. For example, fingerprint scanner 914 may detect a fingerprint of the user and provide processor 408 with data representative of the fingerprint. Processor 408 may process the fingerprint data in any suitable manner (e.g., by comparing the fingerprint to known fingerprints included in a database) to authenticate the user.

Webcam 918 may be configured to facilitate video communication by a user of diagnostic system 400 with a remotely located user (e.g., during or after a surgical procedure). Such video communication may be performed in any suitable manner.

Physical input buttons 916 may be implemented, for example, by a directional pad and/or any other suitable type of physical input button. A user of diagnostic system 400 may interact with physical input buttons 916 to perform various operations with respect to a diagnostic application being executed by processor 408. For example, the user may use the physical input buttons 916 to interact with a graphical user interface displayed on display screen 406.

In some examples, physical input buttons 916 may be configured to be selectively programmed (e.g., as hotkeys) to perform one or more functions associated with the diagnostic application. For example, a particular physical input button 916 may be programmed by a user to start and/or stop acoustic stimulation being applied to a cochlear implant recipient by diagnostic system 400.

In some examples, processor 408 may be configured to wirelessly connect to an input device configured to be used by the user in connection with the diagnostic application. For example, processor 408 may be configured to wirelessly connect (e.g., via Bluetooth™ and/or any other suitable wireless communication protocol) to a keyboard, mouse, remote control, and/or any other wireless input device as may serve a particular implementation. In this manner, the user may selectively use physical input buttons 916, a touchscreen capability of display screen 406, and/or a wireless input device to interact with diagnostic system 400.

As shown, a hole 920 may be formed within computing module 402 and configured to serve as a handle for diagnostic system 400. A user may grip computing module 402 by placing his or her fingers within hole 920.

As shown, a barcode scanner 922 may be located on left side 906 of computing module 402. Barcode scanner 922 may alternatively be located on any other side of computing module 402. In some examples, barcode scanner 922 may be configured to scan for an activation code included on one or more components associated with a procedure being performed with respect to cochlear implant 510. The activation code may be used to associate (e.g., register) the components with cochlear implant 510.

As illustrated in FIG. 10B, computing module 402 may include batteries 924-1 and 924-2. Batteries 924 may be configured to provide operating power for various components included within computing module 402 and base module 404. In some examples, batteries 924 may be hot-swappable. In other words, one of batteries 924 (e.g., battery 924-1) may be removed and replaced while the other battery (e.g., battery 924-2) is used to provide power to computing module 402 and base module 404.

As illustrated in FIGS. 9B and 11B, ports 414, 416, and 418 are located on a side surface 926 of base module 404. Ports 414, 416, and 418 may alternatively be located on any other surface of base module 404.

As described above, base module 404 may be configured to serve as a stand for computing module 402 while base module 404 is attached to computing module 402. The stand functionality of base module 404 is illustrated in FIGS. 11A-11B.

As shown, base module 404 includes a top surface 928 configured to selectively attach to back side 904 of computing module 402. Base module 404 may alternatively attach to any other side of computing module 402. Base module 404 further includes a bottom surface 930 configured to be placed on a resting surface 932. Bottom surface 930 is angled with respect to back side 904 of computing module 402. This provides a viewing angle 934 for display screen 406 that is greater than zero degrees with respect to resting surface 932. In some examples, base module 404 may be adjustable to selectively provide different viewing angles for display screen 406 with respect to resting surface 932. This adjustability may be realized in any suitable manner. For example, a user may manually adjust bottom surface 930 to different angles with respect to back side 904 of computing module 402.

FIG. 12 illustrates an exemplary configuration in which base module 404 is detached from computing module 402. Base module 404 may be detached from computing module 402 in any suitable manner. For example, base module 404 may include one or more locking mechanisms that may be actuated by a user to detach base module 404 from computing module 402.

Various operations that may be performed by diagnostic system 300 will now be described. It will be recognized that diagnostic system 300 may perform additional or alternative operations to those described herein as may serve a particular implementation.

As mentioned, diagnostic system 300 may direct a display screen to display a graphical user interface that includes a selectable option to perform an electrode sweep with respect to a plurality of electrodes disposed on an electrode lead implanted at least partially within a cochlea of a recipient of a cochlear implant. The display screen may be similar to or implemented by any of the display screens described herein. Diagnostic system 300 may direct the display screen to display the graphical user interface in accordance with a diagnostic application being executed by diagnostic system 300.

Figure 13:
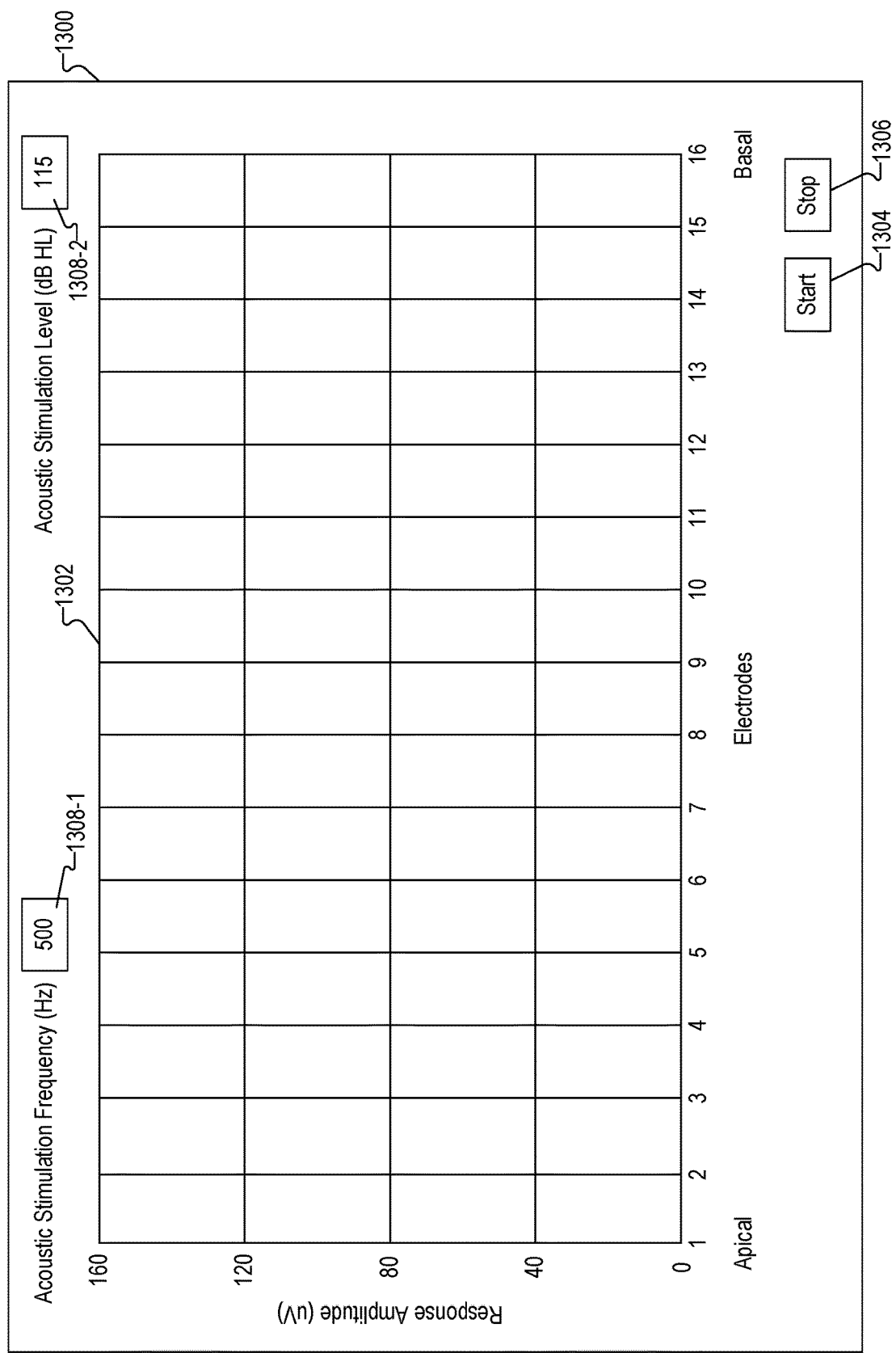
FIGS. 13-18 illustrate exemplary graphical user interfaces that may be presented according to principles described herein.

FIG. 13 illustrates an exemplary graphical user interface 1300 that may be presented by diagnostic system 300 by way of a display screen. As shown, graphical user interface 1300 may include a graph 1302, a start option 1304, a stop option 1306, and fields 1308-1 and 1308-2. Graphical user interface 1300 may include additional or alternative display elements as may serve a particular implementation.

As shown, graph 1302 includes a plurality of electrode numbers along an x-axis and various evoked response amplitude values along a y-axis. It will be recognized that the x and y axes may be switched in alternative examples. The electrode numbers shown along the x-axis represent a plurality of electrodes disposed on an electrode lead that has been at least partially implanted within a cochlea of a recipient of a cochlear implant. In the examples provided herein, it will be assumed that sixteen electrodes are disposed on the electrode lead. The most apical electrode (i.e., the electrode that is most distally located on the electrode lead) is labeled "1" in graph 1302. The most basal electrode (i.e., the electrode that is most proximately located on the electrode lead) is labeled "16" in graph 1302. It will be recognized that any number of electrodes may be disposed on the electrode lead as may serve a particular implementation.

In response to a user selection of the start option 1304, diagnostic system 300 may perform an electrode sweep with respect to a plurality of electrodes disposed on the electrode lead. The electrode sweep may be performed with respect to all of the electrodes disposed on the electrode lead. Alternatively, as will be described below, the electrode sweep may be performed with respect to just a subset of the electrodes disposed on electrode lead.

Diagnostic system 300 may detect a selection by a user of start option 1304 in any suitable manner. In response to the selection of start option 1304, diagnostic system 300 may direct an acoustic stimulation generator to apply acoustic stimulation to the recipient. The acoustic stimulation generator may be similar to or implemented by any of the acoustic stimulation generators described herein.

The frequency and stimulation level of the acoustic stimulation applied to the recipient may be set by a user interacting with fields 1308-1 and 1308-2. For example, as shown in FIG. 13, field 1308-1 indicates that the acoustic stimulation frequency is 500 Hz and field 1308-2 indicates that the acoustic stimulation level is 115 dB HL. The user may interact with fields 1308-1 and 1308-2 to adjust the frequency and stimulation level of the acoustic stimulation to any suitable values as may serve a particular implementation. In some alternative embodiments, diagnostic system 300 may automatically select the frequency and stimulation level of the acoustic stimulation. For example, diagnostic system 300 may sweep through a plurality of stimulation frequencies in order to automatically generate a plurality of different tuning curves.

Diagnostic system 300 may direct the cochlear implant to use each electrode in the plurality of electrodes to record an evoked response measurement in response to the acoustic stimulation. In some examples, the evoked response measurements are concurrently recorded by the plurality of electrodes. Alternatively, the evoked response measurements are recorded sequentially by the plurality of electrodes.

Diagnostic system 300 may determine an amplitude of each of the evoked response measurements recorded by the plurality of electrodes and present, within the graphical user interface, a tuning curve that graphically indicates the amplitude of the evoked response measurements.

Figure 14:
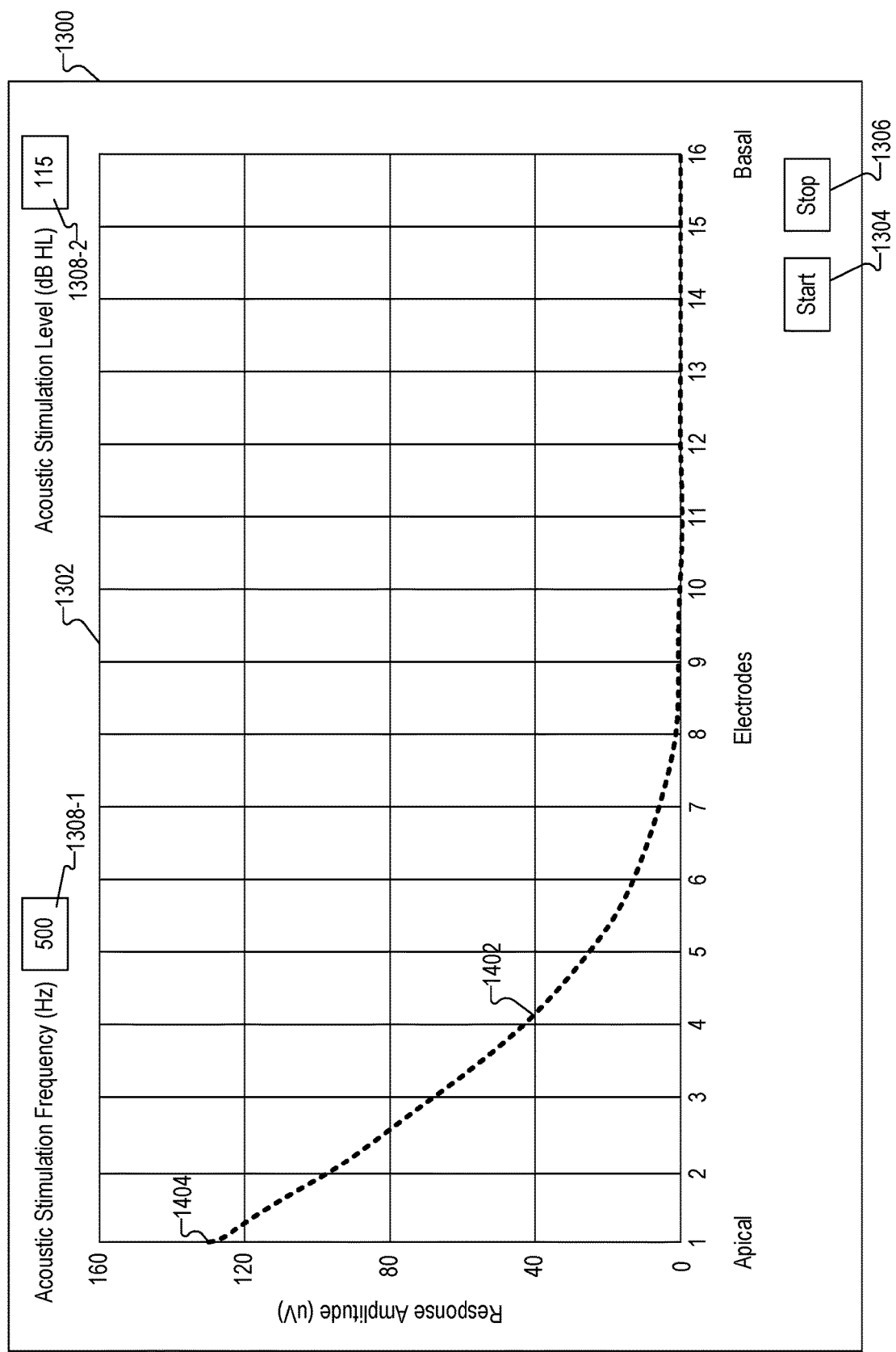

To illustrate, FIG. 14 shows a tuning curve 1402 presented within graphical user interface 1300 (i.e., within graph 1302 of graphical user interface 1300). Tuning curve 1402 graphically indicates the amplitude of each of the evoked response measurements recorded by electrodes 1 through 16 in response to acoustic stimulation having a frequency of 500 Hz. As shown, a peak amplitude value 1404 of tuning curve 1402 is located at a position that corresponds to electrode 1. This means that electrode 1 is positioned at a location within the cochlea that corresponds to 500 Hz.

As shown, the amplitude of tuning curve 1402 decays as the electrode number gets higher (i.e., closer to the base of the cochlea). For example, the amplitudes of the evoked response measurements recorded by electrodes 8 through 16 are at or around 0 µV. This indicates that these electrodes did not record an evoked response in response to the acoustic stimulation.

At any time during the electrode sweep, the user may stop the electrode sweep by selecting stop option 1306. In response to a user selection of stop option 1306, diagnostic system 300 may direct the acoustic stimulation generator to stop applying the acoustic stimulation to the recipient.

Figure 15:
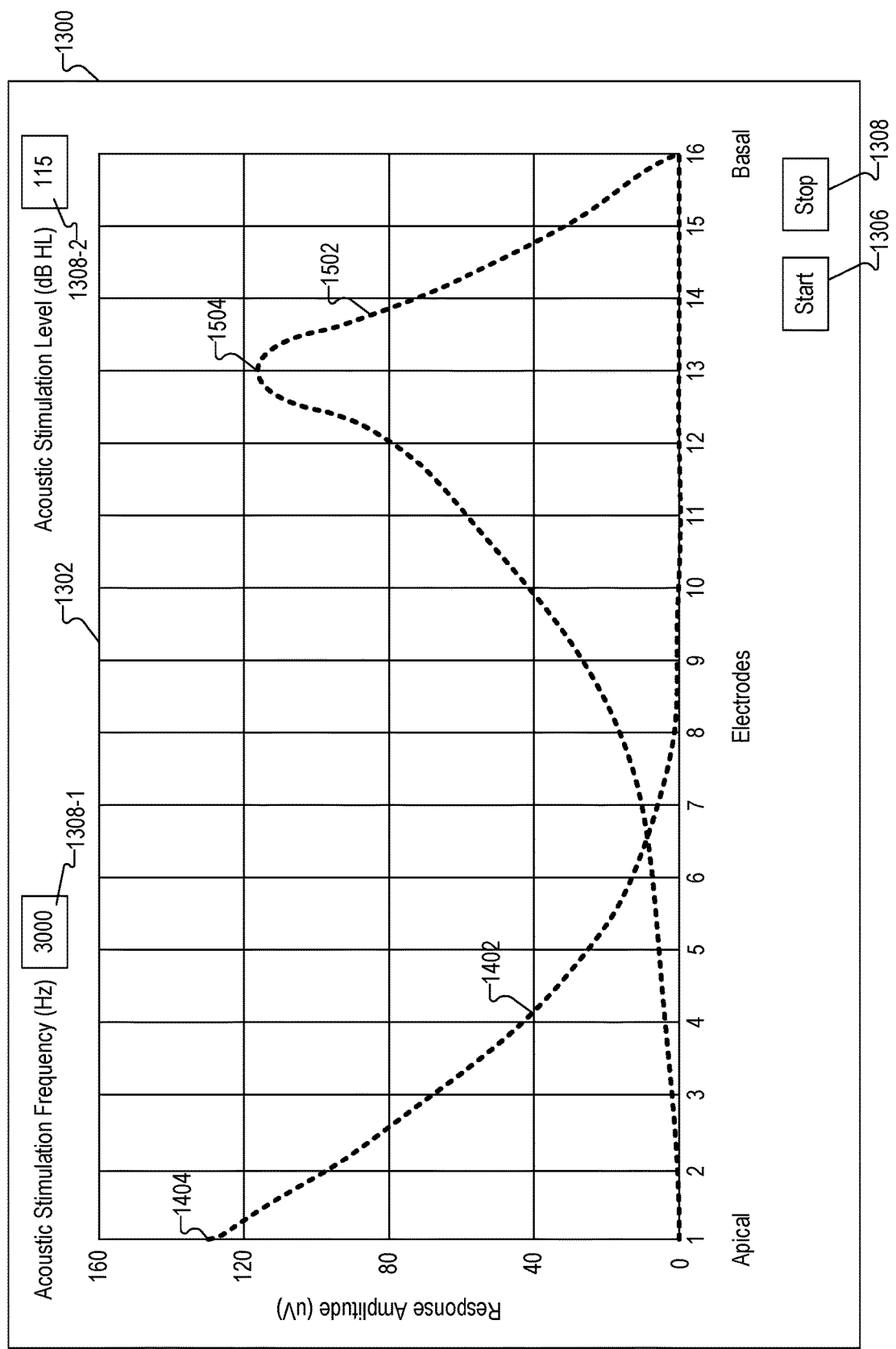

Diagnostic system 300 may perform additional electrode sweeps for other acoustic stimulation frequencies to determine locations of other electrodes on the electrode lead. For example, FIG. 15 shows graphical user interface 1300 after the user changes the acoustic stimulation frequency from 500 Hz to 3000 Hz and again selects start option 1304. As shown, a tuning curve 1502 associated with the stimulation frequency of 3000 Hz is presented within graphical user interface 1300. Tuning curve 1502 has a peak amplitude value 1504 located at a position that corresponds to electrode 13. This means that electrode 13 is positioned at a location within the cochlea that corresponds to 3000 Hz.

As shown, tuning curves 1402 and 1502 may be concurrently presented within graphical user interface 1300. In this manner a user may visually identify electrode positioning for a plurality of electrodes at the same time. In alternative embodiments, only a single tuning curve is displayed at any given time within graphical user interface 1300.

Figure 16:
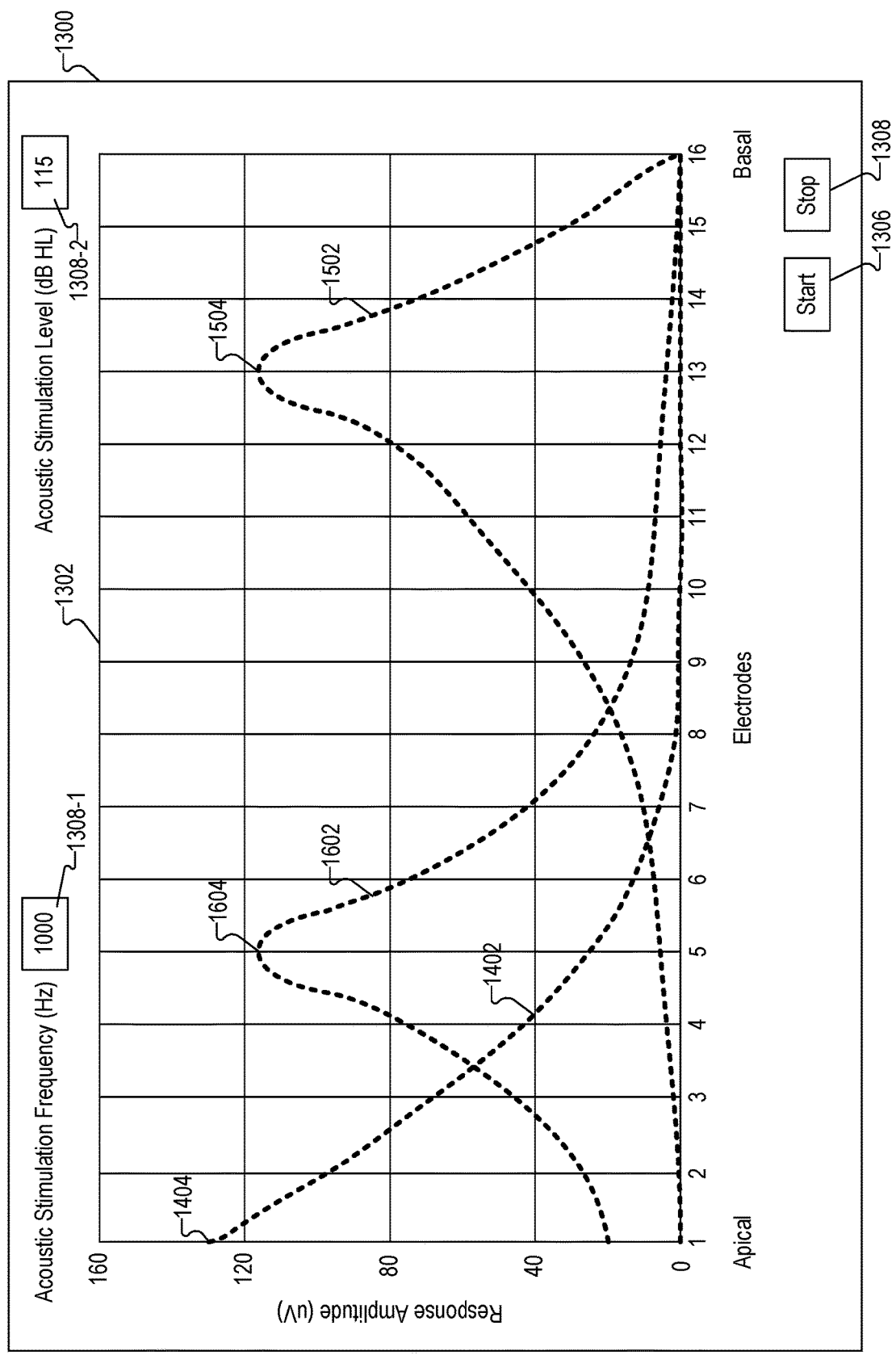

FIG. 16 shows graphical user interface 1300 after the user changes the acoustic stimulation frequency from 3000 Hz to 1000 Hz and again selects start option 1304. As shown, a tuning curve 1602 associated with the stimulation frequency of 1000 Hz is presented within graphical user interface 1300. Tuning curve 1602 has a peak amplitude value 1604 located at a position that corresponds to electrode 5. This means that electrode 5 is positioned at a location within the cochlea that corresponds to 1000 Hz.

In the examples of FIGS. 14-16, all of the electrodes disposed on the electrode lead recorded evoked response measurements. In some cases, it may be desirable to have only a subset of electrodes record evoked response measurements during an electrode sweep. For example, a user may know that a peak amplitude value of a tuning curve associated with a particular frequency will likely occur within a certain range of electrodes. The user may select only these electrodes to be included in the electrode sweep in order to save time and resources associated with performing the electrode sweep across all the electrodes.

Hence, in some examples, diagnostic system 300 may provide, within graphical user interface 1300, an option for the user to select only certain electrodes to be included in the electrode sweep. In other words, a total of N electrodes may be disposed on the electrode lead. In response to user input, diagnostic system 300 may select M electrodes for inclusion in the plurality of electrodes that are included in the electrode sweep, where M is less than N. Additionally or alternatively, diagnostic system 300 may automatically select the M electrodes. For example, in response to a user selection of electrode 1 and electrode 4, diagnostic system 300 may automatically select electrodes 1 through 4 for inclusion in the electrode sweep.

Figure 17:
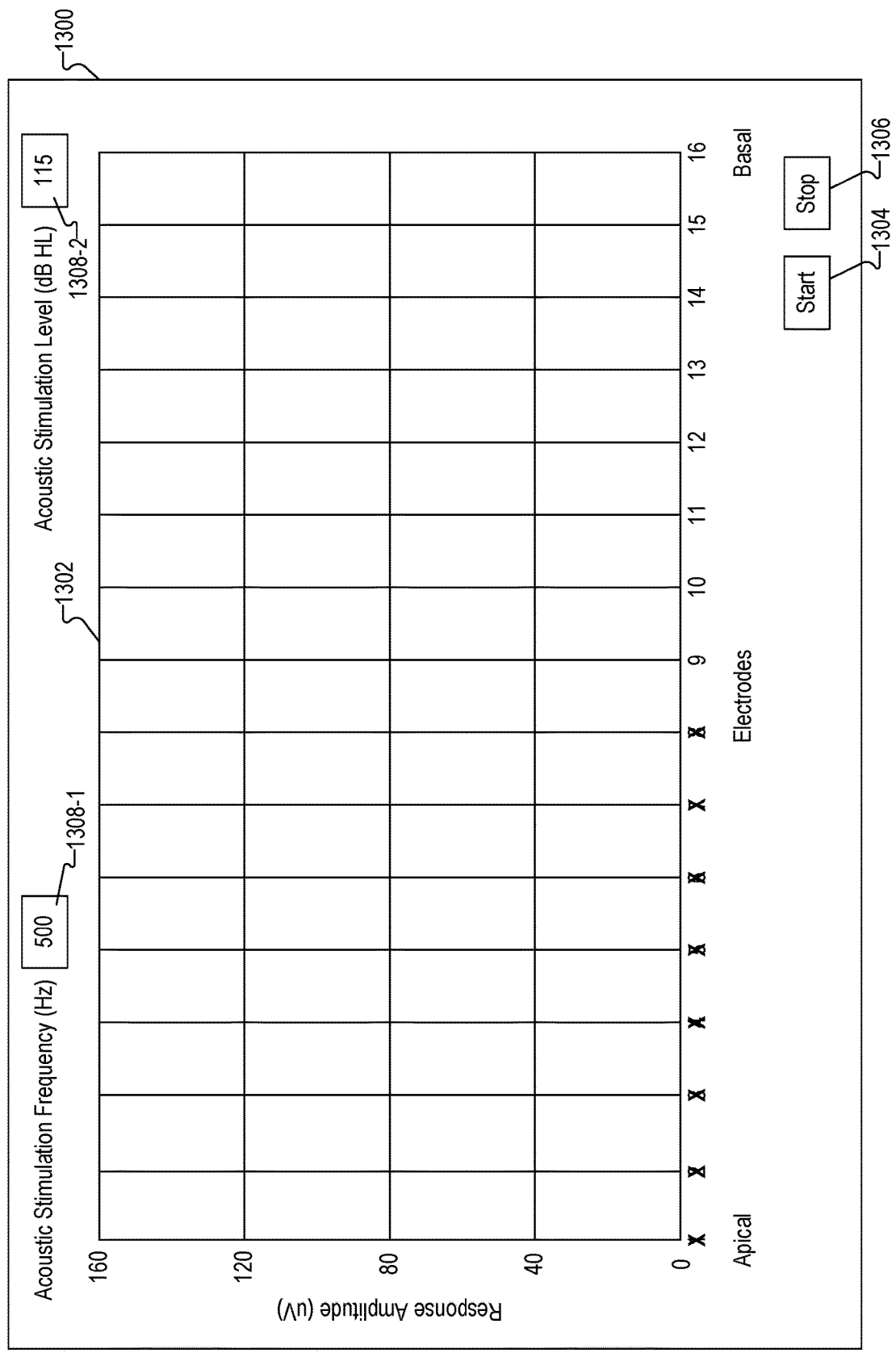

A user may select electrodes for inclusion in the electrode sweep in any suitable manner. For example, a user may simply click, perform a touch gesture with respect to, or otherwise manually select one or more electrodes to be excluded from the plurality of electrodes included in the electrode sweep. To illustrate, FIG. 17 shows graphical user interface 1300 with electrodes 1 through 8 excluded from the electrode sweep. This is graphically indicated in FIG. 17 by each of these electrode numbers being crossed out. In this configuration, the electrode sweep will only include electrodes 9 through 16.

In some examples, a phase of the evoked response measurements recorded by each electrode may additionally or alternatively be displayed within graph 1302. The phase of an evoked response numerically describes the relationship between timing of the evoked response (e.g., the timing of peaks of the evoked response) relative to timing of the incoming acoustic stimulation causing the evoked response. For a pure tone, the phase of the evoked response may be described in radians or degrees if the delay between input peaks (i.e. peaks of the acoustic stimulation) and output peaks (i.e. peaks of the evoked response) is scaled by the inter-peak period for each waveform. For a more complex waveform, the phase can also be described in terms of a phase delay, measured in milliseconds.

Because the phase is inherently a cyclic measure, phase delay measured based on phase alone is not unique. For example, a phase delay of P and a phase delay of P+C may result in the same phase if C represents the period of the incoming signal. Consequently, phase delay estimation may need to consider either an evoked response from an early part of the waveform (an onset response) or a more complex stimulus. The techniques for doing so shall be apparent to those skilled in the art.

In a healthy cochlea, a phase of an evoked response signal recorded within the cochlea may be expected to change methodically in accordance with the location within the cochlea (e.g., the cochlear depth) of the electrode as the electrode is inserted apically (e.g., during an insertion procedure). Specifically, it may be expected that the phase will increase in a way that is consistent with an increasing delay as the cochlear depth of the electrode increases during the insertion procedure of the electrode into the cochlea. Additionally, as the electrode approaches and/or passes near the target frequency depth associated with the acoustic stimulation, the phase may be expected to change rapidly. Specifically, at the target frequency depth, the phase may be significantly larger (e.g., 180 degrees larger) than the phase at more basal locations passed by the electrode prior to the target frequency depth during the insertion procedure. This is described in more detail in WO2017/131675, which application is incorporated herein by reference in its entirety.

Figure 18:
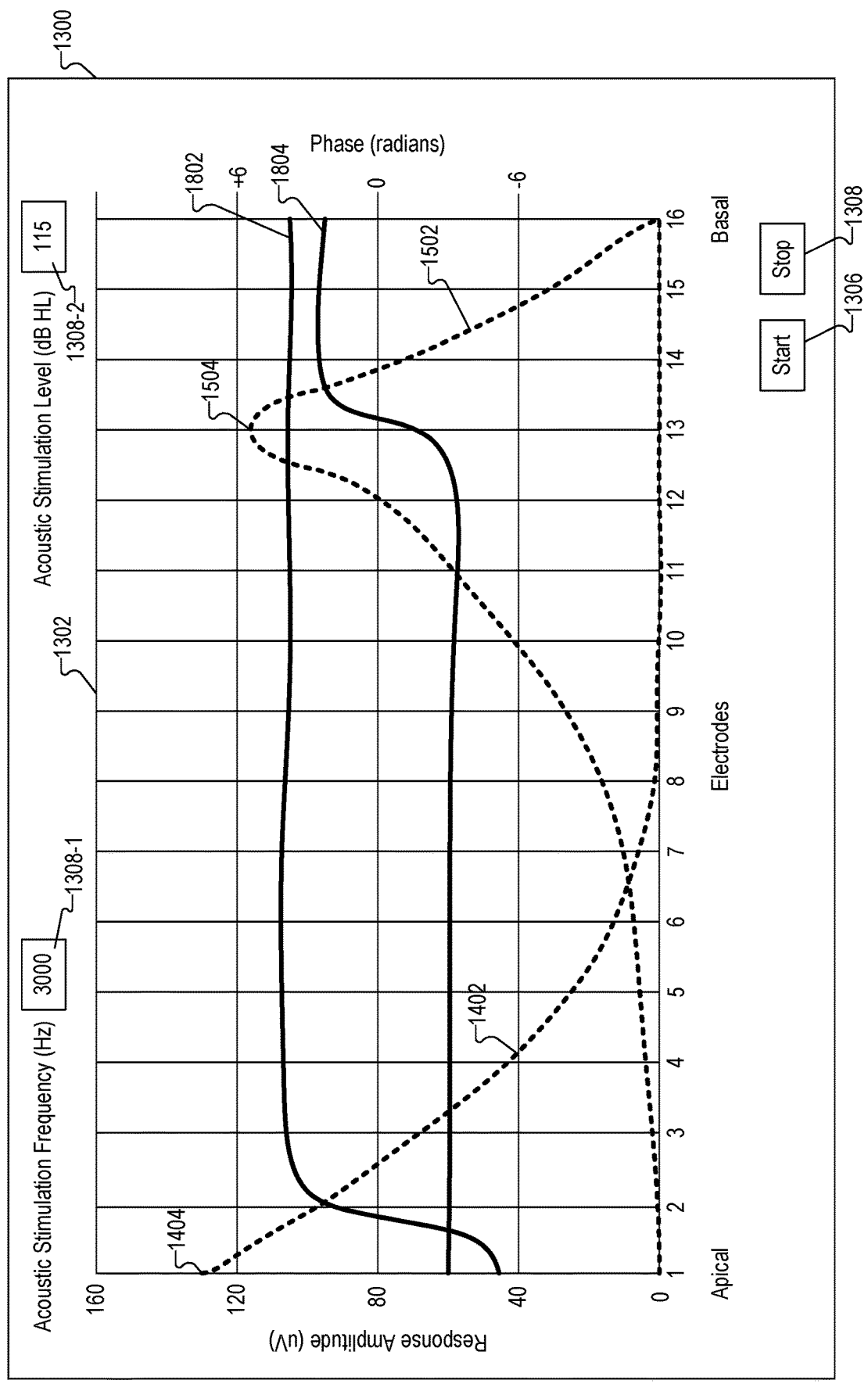

FIG. 18 shows how phase of evoked response measurements recorded by each electrode may displayed within graph 1302. FIG. 18 is similar to FIG. 15, but also shows a phase curve 1802 that corresponds to tuning curve 1404 and a phase curve 1804 that corresponds to tuning curve 1502. Phase curves 1802 and 1804 are plotted with respect to the vertical axis on the right side of graph 1302 and may further assist a user in determining which electrode corresponds to the frequency of the acoustic stimulation.

For example, diagnostic system 300 may identify a change in a phase of a phase curve associated with a tuning curve, identify an electrode that corresponds to the change in phase, and map the frequency to the identified electrode. To illustrate, in the example of FIG. 18, a sudden change in phase curve 1804 indicates that a frequency of 3000 Hz corresponds to electrode 13. Diagnostic system 300 may utilize this information separate from or together with tuning curve 1502 to map the frequency of the acoustic stimulation to electrode 13 in any of the ways described herein.

While phase curves 1802 and 1804 are displayed currently with tuning curves 1402 and 1502 in FIG. 18, it will be recognized that phase curves 1802 and 1804 may alternatively be displayed in their own graph.

In the examples of FIGS. 14-16, diagnostic system 300 performs electrode sweeps for frequencies that are manually selected by a user. Additionally or alternatively, diagnostic system 300 may be configured to automatically step through a plurality of frequencies in order to generate and present a plurality of tuning curves. Each of the tuning curves may be labeled or otherwise graphically associated with its corresponding frequency. In this manner, a user may readily ascertain electrode positioning for a plurality of electrodes without having to manually input each of the different frequencies.

In some examples, diagnostic system 300 may dynamically select the frequencies through which diagnostic system 300 steps. In this manner, diagnostic system 300 may choose the appropriate frequencies to result in tuning curves that have peak amplitude values at each of the electrodes. For example, diagnostic system 300 may initially select a frequency of 2750 Hz. During the electrode sweep associated with this frequency, the peak amplitude value of the resulting tuning curve may be close to, but not centered at, electrode 13. Diagnostic system 300 may accordingly slightly increase the frequency and perform electrode sweeps until diagnostic system 300 detects that the peak amplitude value of one of the tuning curves (e.g., tuning curve 1502) is exactly positioned at electrode 13. Diagnostic system 300 may then designate the frequency associated with this tuning curve as being the frequency at which electrode 13 is located.

Diagnostic system 300 may utilize tuning curves generated in any of the ways described herein to fit a sound processor to a recipient. For example, diagnostic system 300 may generate tuning curves 1402, 1502, and 1602 shown in FIG. 16. Diagnostic system 300 may identify each of peak amplitude values 1404, 1504, and 1604 and their corresponding electrodes (electrodes 1, 13, and 5 in the example of FIG. 16). Diagnostic system 300 may map the frequencies associated with each of the tuning curves to the identified electrodes. For example, diagnostic system 300 may map 500 Hz to electrode 1, 3000 Hz to electrode 13, and 1000 Hz to electrode 5. This mapping may be performed in any suitable manner. For example, diagnostic system 300 may program a sound processor associated with the recipient's cochlear implant to direct the cochlear implant to apply electrical stimulation representative of 500 Hz by way of electrode 1, electrical stimulation representative of 3000 Hz by way of electrode 13, and electrical stimulation representative of 1000 Hz by way of electrode 5.

In some examples, diagnostic system 300 may map a range of frequencies centered around each of these frequencies to each electrode. For example, diagnostic system 300 may map a range of frequencies between 2750 and 3250 Hz to electrode 13. The range of frequencies mapped to each electrode may be of any suitable size as may serve a particular implementation.

In some examples, diagnostic system 300 may use the tuning curves generated as described herein to generate and present, within graphical user interface 1300, an electrode positioning map that graphically indicates physical locations of the electrodes within the cochlea. For example, a graphical representation of the cochlea similar to that shown in FIG. 2 may be presented within graphical user interface 1300. Within this graphical representation, markers indicating physical locations of each electrode on the electrode lead may be displayed. In this manner, a user may easily visualize the positioning of each electrode within the cochlea.

Figure 19:
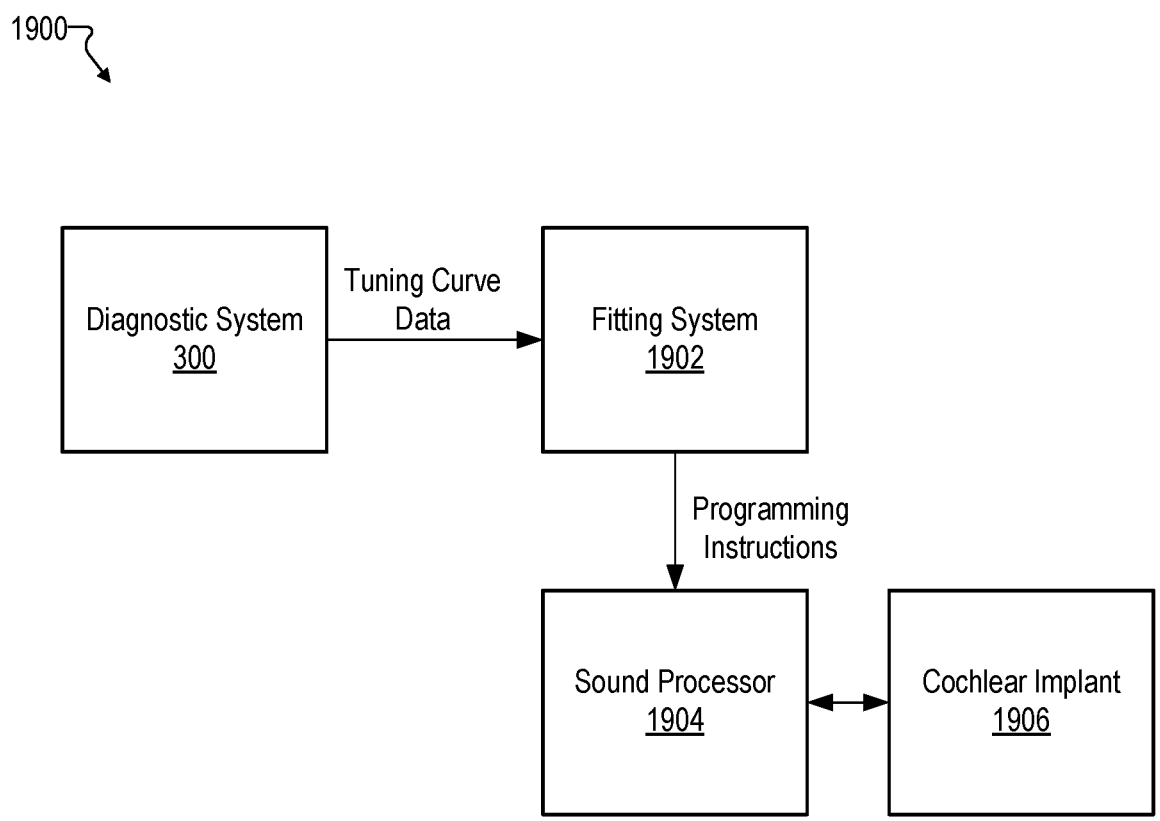
FIG. 19 illustrates an exemplary configuration in which a diagnostic system is communicatively coupled to a fitting system according to principles described herein.

FIG. 19 illustrates an exemplary configuration 1900 in which diagnostic system 300 is communicatively coupled to a fitting system 1902. Fitting system 1902 may be selectively and communicatively coupled to a sound processor 1904 associated with a recipient and configured to wirelessly communicate with a cochlear implant 1906 implanted within the recipient. Sound processor 1904 may be similar to or implemented by any of the sound processors described herein. Cochlear implant 1906 may be similar to or implemented by any of the cochlear implants described herein.

In configuration 1900, diagnostic system 300 may transmit tuning curve data representative of one or more tuning curves generated by diagnostic system to fitting system 1902. Fitting system 1902 may use the tuning curve data to fit sound processor during a fitting session in which sound processor 1904 and cochlear implant 1906 are fitted to the recipient. For example, sound processor 1904 may use the tuning curve data to generate programming instructions that are transmitted to sound processor 1904. The programming instructions may specify one or more parameters that govern an operation of sound processor 1904. For example, the programming instructions may specify a mapping between frequencies and electrodes as determined using the tuning curve data.

In some examples, fitting system 1902 may alternatively implement diagnostic system 300. In these examples, fitting system 1902 performs the tuning curve generation operations described herein. Hence, fitting system 1902 may generate the tuning curve data itself without having to be connected to a separate diagnostic system 300.

Figure 20:
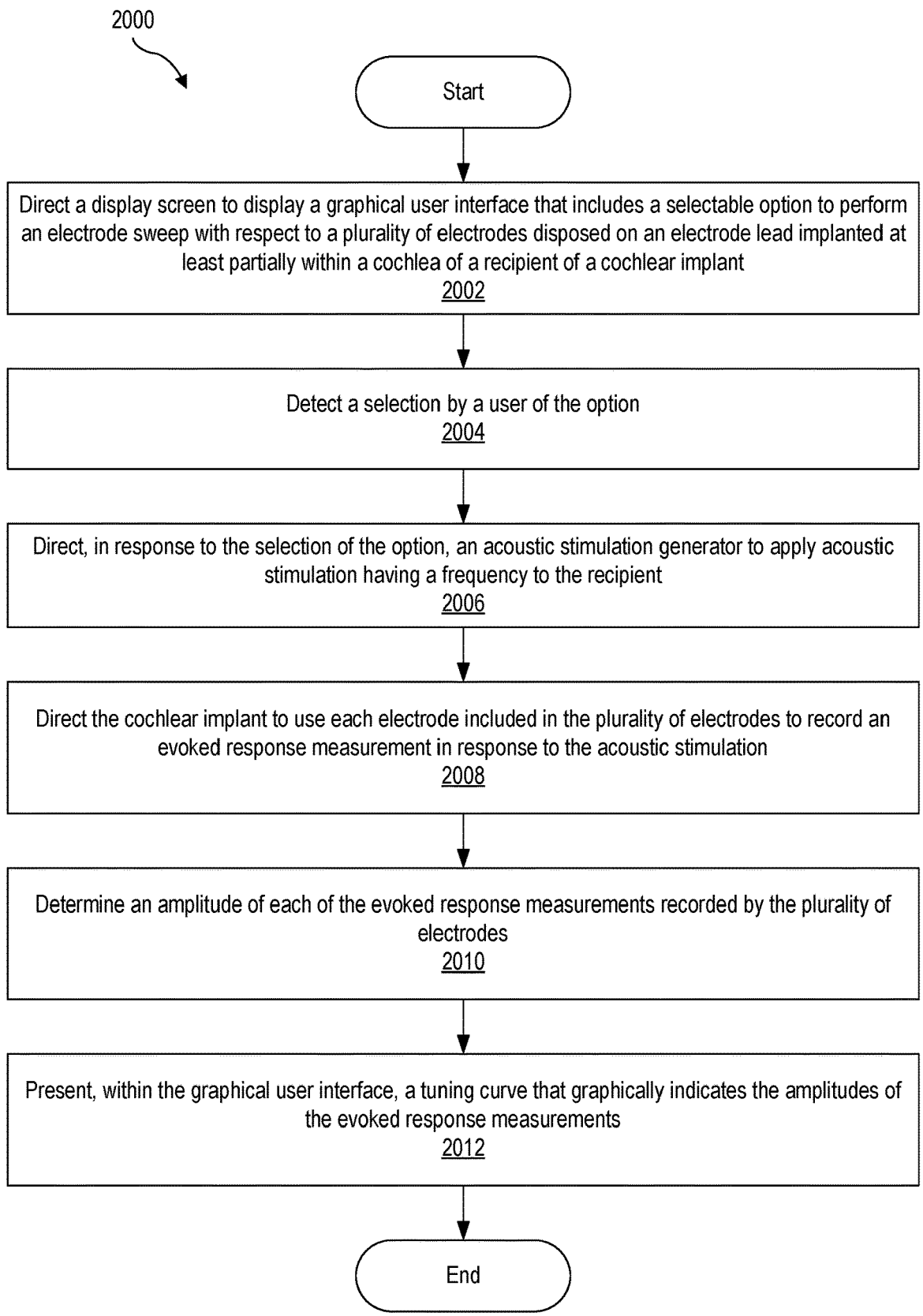
FIG. 20 illustrates an exemplary method according to principles described herein.

FIG. 20 illustrates an exemplary method 2000. The operations shown in FIG. 20 may be performed by diagnostic system 300 and/or any implementation thereof. While FIG. 20 illustrates exemplary operations according to one embodiment, other embodiments may omit, add to, reorder, and/or modify any of the operations shown in FIG. 20.

In operation 2002, a diagnostic system directs a display screen to display a graphical user interface that includes a selectable option to perform an electrode sweep with respect to a plurality of electrodes disposed on an electrode lead implanted at least partially within a cochlea of a recipient of a cochlear implant. Operation 2002 may be performed in any of the ways described herein.

In operation 2004, the diagnostic system detects a selection by a user of the option. Operation 2004 may be performed in any of the ways described herein.

In operation 2006, the diagnostic system directs, in response to the selection of the option, an acoustic stimulation generator to apply acoustic stimulation having a frequency to the recipient. Operation 2006 may be performed in any of the ways described herein.

In operation 2008, the diagnostic system directs the cochlear implant to use each electrode included in the plurality of electrodes to record an evoked response measurement in response to the acoustic stimulation. Operation 2008 may be performed in any of the ways described herein.

In operation 2010, the diagnostic system determines an amplitude of each of the evoked response measurements recorded by the plurality of electrodes. Operation 2010 may be performed in any of the ways described herein.

In operation 2012, the diagnostic system presents, within the graphical user interface, a tuning curve that graphically indicates the amplitudes of the evoked response measurements. Operation 2012 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 21:
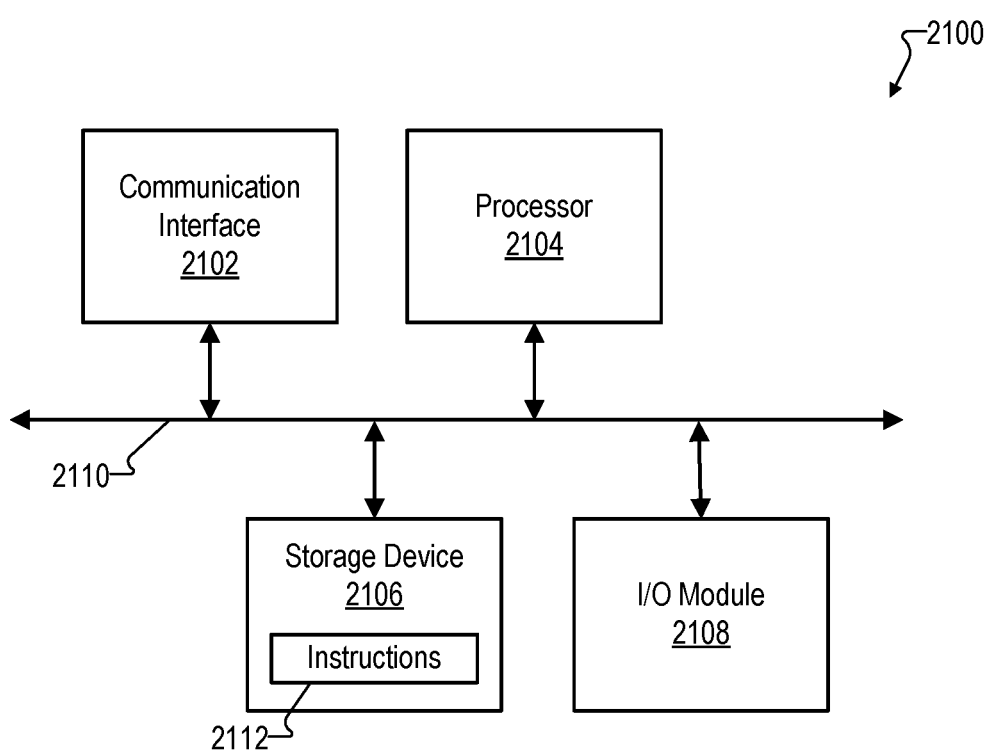
FIG. 21 illustrates an exemplary computing device according to principles described herein.

FIG. 21 illustrates an exemplary computing device 2100 that may be specifically configured to perform one or more of the processes described herein. As shown in FIG. 21, computing device 2100 may include a communication interface 2102, a processor 2104, a storage device 2106, and an input/output ("I/O") module 2108 communicatively connected one to another via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data and/or interpreting, executing, and/or directing execution of one or more of the instructions, processes, and/or operations described herein. Processor 2104 may perform operations by executing computer-executable instructions 2112 (e.g., an application, software, code, and/or other executable data instance) stored in storage device 2106.

Storage device 2106 may include one or more data storage media, devices, or configurations and may employ any type, form, and combination of data storage media and/or device. For example, storage device 2106 may include, but is not limited to, any combination of the non-volatile media and/or volatile media described herein. Electronic data, including data described herein, may be temporarily and/or permanently stored in storage device 2106. For example, data representative of computer-executable instructions 2112 configured to direct processor 2104 to perform any of the operations described herein may be stored within storage device 2106. In some examples, data may be arranged in one or more databases residing within storage device 2106.

I/O module 2108 may include one or more I/O modules configured to receive user input and provide user output. I/O module 2108 may include any hardware, firmware, software, or combination thereof supportive of input and output capabilities. For example, I/O module 2108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 2100. For example, storage facility 302 may be implemented by storage device 2106, and processing facility 304 may be implemented by processor 2104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a memory storing instructions;
    a processor communicatively coupled to the memory and configured to execute the instructions to:
        direct a display screen to display a graphical user interface that includes a selectable option to perform an electrode sweep with respect to a plurality of electrodes disposed on an electrode lead implanted at least partially within a cochlea of a recipient of a cochlear implant, the electrode sweep including all of the plurality of electrodes recording evoked response measurements in response to acoustic stimulation having a frequency being applied to the recipient;
        detect a selection by a user of the option;
        direct, in response to the selection of the option, an acoustic stimulation generator to apply, by way of a sound delivery apparatus, the acoustic stimulation having the frequency to the recipient;
        direct the cochlear implant to use each electrode included in the plurality of electrodes to record an evoked response measurement in response to the acoustic stimulation;
        determine an amplitude of each of the evoked response measurements recorded by the plurality of electrodes; and
        present, within the graphical user interface, a tuning curve that graphically indicates the amplitudes of the evoked response measurements.

2. The system of claim 1, wherein the processor is further configured to execute the instructions to receive, by way of the graphical user interface, user input that specifies the frequency.

3. The system of claim 1, wherein the processor is further configured to execute the instructions to:
    receive, by way of the graphical user interface and subsequent to presenting the tuning curve, user input that specifies an additional frequency;
    detect, subsequent to receiving the user input that specifies the additional frequency, an additional selection by the user of the option to perform the electrode sweep;
    direct, in response to the additional selection of the option, the acoustic stimulation generator to apply additional acoustic stimulation having the additional frequency to the recipient;
    direct the cochlear implant to use each electrode included in the plurality of electrodes to record an additional evoked response measurement in response to the additional acoustic stimulation;
    determine an amplitude of each of the additional evoked response measurements recorded by the plurality of electrodes; and
    present, within the graphical user interface, an additional tuning curve that graphically indicates the amplitudes of the additional evoked response measurements.

4. The system of claim 3, wherein the additional tuning curve is presented concurrently with the tuning curve within the graphical user interface.

5. The system of claim 1, wherein:
    a total of N electrodes are disposed on the electrode lead; and
    the plurality of electrodes includes all of the N electrodes.

6. The system of claim 1, wherein:
a total of N electrodes are disposed on the electrode lead; and
the plurality of electrodes only includes M electrodes in the N electrodes, where M is less than N.

7. The system of claim 6, wherein the processor is further configured to execute the instructions to provide, within the graphical user interface, an option for the user to select the M electrodes.

8. The system of claim 1, wherein the processor, the display screen, and the acoustic stimulation generator are included with a stand-alone diagnostic system that does not include a sound processor configured to be wirelessly coupled to the cochlear implant.

9. The system of claim 8, wherein the stand-alone diagnostic system comprises:
a computing module that houses the processor and the display screen; and
a base module configured to be attached to the computing module and that houses the acoustic stimulation generator.

10. The system of claim 1, wherein the processor is included in a fitting system configured to be selectively and communicatively coupled to a sound processor associated with the recipient and configured to wirelessly communicate with the cochlear implant.

11. The system of claim 1, wherein the processor is further configured to execute the instructions to:
identify a peak amplitude value in the tuning curve;
identify an electrode included in the plurality of electrodes and that corresponds to the peak amplitude value; and
map the frequency to the identified electrode.

12. The system of claim 11, wherein the mapping of the frequency to the identified electrode comprises programming a sound processor associated with the cochlear implant to direct the cochlear implant to apply electrical stimulation representative of the frequency by way of the identified electrode.

13. The system of claim 1, wherein the processor is further configured to execute the instructions to transmit data representative of the tuning curve to a fitting system for use during a fitting session in which cochlear implant is fitted to the recipient.

14. The system of claim 1, wherein the processor is further configured to execute the instructions to use the tuning curve to generate and present, within the graphical user interface, an electrode positioning map that graphically indicates physical locations of the electrodes within the cochlea.

15. The system of claim 1, wherein the evoked response measurements are concurrently recorded by the electrodes.

16. The system of claim 1, wherein the processor is further configured to execute the instructions to:
identify a change in a phase of a phase curve associated with the tuning curve;
identify an electrode included in the plurality of electrodes and that corresponds to the change in phase; and
map the frequency to the identified electrode.

17. A diagnostic system comprising:
a computing module comprising:
a display screen, and
a processor configured to direct the display screen to display a graphical user interface that includes a selectable option to perform an electrode sweep with respect to a plurality of electrodes disposed on an electrode lead implanted at least partially within a cochlea of a recipient of a cochlear implant, the electrode sweep including all of the plurality of electrodes recording evoked response measurements in response to acoustic stimulation having a frequency being applied to the recipient; and
a base module configured to attach to the computing module and serve as a stand for the computing module, the base module housing an interface unit configured to be communicatively coupled to the processor and to the cochlear implant while the base module is attached to the computing module;
wherein the processor is further configured to:
detect a selection by a user of the option;
direct, in response to the selection of the option, the interface unit to apply, by way of a sound delivery apparatus, the acoustic stimulation having the frequency to the recipient;
direct the interface unit to instruct the cochlear implant to use each electrode included in the plurality of electrodes to record an evoked response measurement in response to the acoustic stimulation;
determine an amplitude of each of the evoked response measurements recorded by the plurality of electrodes; and
present, within the graphical user interface, a tuning curve that graphically indicates the amplitudes of the evoked response measurements.

18. The diagnostic system of claim 17, wherein the processor is further configured to:
receive, by way of the graphical user interface and subsequent to presenting the tuning curve, user input that specifies an additional frequency;
detect, subsequent to receiving the user input that specifies the additional frequency, an additional selection by the user of the option to perform the electrode sweep;
direct, in response to the additional selection of the option, the interface unit to apply additional acoustic stimulation having the additional frequency to the recipient;
direct the cochlear implant to use each electrode included in the plurality of electrodes to record an additional evoked response measurement in response to the additional acoustic stimulation;
determine an amplitude of each of the additional evoked response measurements recorded by the plurality of electrodes; and
present, within the graphical user interface, an additional tuning curve that graphically indicates the amplitudes of the additional evoked response measurements.

19. The diagnostic system of claim 18, wherein the additional tuning curve is presented concurrently with the tuning curve within the graphical user interface.

20. A method comprising:
directing, by a diagnostic system, a display screen to display a graphical user interface that includes a selectable option to perform an electrode sweep with respect to a plurality of electrodes disposed on an electrode lead implanted at least partially within a cochlea of a recipient of a cochlear implant, the electrode sweep including all of the plurality of electrodes recording evoked response measurements in response to acoustic stimulation having a frequency being applied to the recipient;
detecting, by the diagnostic system, a selection by a user of the option;
directing, by the diagnostic system in response to the selection of the option, an acoustic stimulation generator to apply, by way of a sound delivery apparatus, the acoustic stimulation having the frequency to the recipient;

directing, by the diagnostic system, the cochlear implant to use each electrode included in the plurality of electrodes to record an evoked response measurement in response to the acoustic stimulation;

determining, by the diagnostic system, an amplitude of each of the evoked response measurements recorded by the plurality of electrodes; and presenting, by the diagnostic system within the graphical user interface, a tuning curve that graphically indicates the amplitudes of the evoked response measurements.

\* \* \* \* \*